United States Patent
Kamen et al.

(10) Patent No.: US 6,651,766 B2
(45) Date of Patent: Nov. 25, 2003

(54) PERSONAL MOBILITY VEHICLES AND METHODS

(75) Inventors: Dean L. Kamen, Bedford, NH (US); Robert R. Ambrogi, Manchester, NH (US); Robert J. Duggan, Northwood, NH (US); Richard Kurt Heinzmann, Francestown, NH (US)

(73) Assignee: Deka Products Limited Partnership, Manchester, NH (US)

(*) Notice: Subject to any disclaimer, the term of this patent is extended or adjusted under 35 U.S.C. 154(b) by 0 days.

(21) Appl. No.: 09/862,839

(22) Filed: May 22, 2001

(65) Prior Publication Data

US 2001/0032743 A1 Oct. 25, 2001

Related U.S. Application Data

(60) Division of application No. 09/325,976, filed on Jun. 4, 1999, which is a continuation-in-part of application No. 08/479,901, filed on Jun. 7, 1995, now Pat. No. 5,975,225, which is a continuation-in-part of application No. 08/384,705, filed on Feb. 3, 1995, now Pat. No. 5,971,091, which is a continuation-in-part of application No. 08/250,693, filed on May 27, 1994, now Pat. No. 5,701,965, which is a continuation-in-part of application No. 08/021,789, filed on Feb. 24, 1993, now abandoned.

(51) Int. Cl.$^7$ ............................................... B62D 61/00
(52) U.S. Cl. ........................... 180/218; 180/7.1; 180/21
(58) Field of Search .......................... 180/7.1, 8.2, 8.3, 180/65.1, 218, 21

(56) References Cited

U.S. PATENT DOCUMENTS

| | | |
|---|---|---|
| 584,127 A | 6/1897 | Draulette et al. |
| 849,270 A | 4/1907 | Schafer et al. |
| 2,742,973 A | 4/1956 | Johannesen |
| 3,145,797 A | 8/1964 | Taylor |
| 3,260,324 A | 7/1966 | Suarez |
| 3,283,398 A | 11/1966 | Andren |
| 3,288,234 A | 11/1966 | Feliz |
| 3,348,518 A | 10/1967 | Forsyth et al. |
| 3,374,845 A | 3/1968 | Selwyn |
| 3,399,742 A | 9/1968 | Malick |
| 3,446,304 A | 5/1969 | Alimanestiano |
| 3,450,219 A | 6/1969 | Fleming |
| 3,515,401 A | 6/1970 | Gross |
| 3,580,344 A | 5/1971 | Floyd |

(List continued on next page.)

FOREIGN PATENT DOCUMENTS

| | | |
|---|---|---|
| DE | 2 048 593 | 5/1971 |
| DE | 31 28 112 A1 | 2/1983 |
| DE | 32 42 880 A1 | 6/1983 |

(List continued on next page.)

OTHER PUBLICATIONS

Kanoh *Adaptive Control of Inverted Pendulum, Computrol*, vol. 2, pp. 69–75 (1983).

Yamafuji *A Proposal for Modular–Structured Mobile Robots for Work that Principally Involve a Vehicle with Two Prallel Wheels, Automation Technology*, vol. 20, pp. 113–118 (1988).

Yamafuji & Kawamura *Study of Postural and Driving Control of Coaxial Bicycle, Paper Read at Meeting of Japan Society of Mechanical Engineering(Series C)*, vol. 54, No. 501, pp. 1114–1121 (May, 1988).

(List continued on next page.)

*Primary Examiner*—Lesley D. Morris
*Assistant Examiner*—Matthew Luby
(74) *Attorney, Agent, or Firm*—Bromberg & Sunstein LLP

(57) ABSTRACT

A class of transportation vehicles for carrying an individual over ground having a surface that may be irregular. This embodiment has a motorized drive, mounted to the ground-contacting module that causes operation of the vehicle in an operating position that is unstable with respect to tipping when the motorized drive arrangement is not powered.

32 Claims, 16 Drawing Sheets

U.S. PATENT DOCUMENTS

| | | |
|---|---|---|
| 3,596,298 A | 8/1971 | Durst, Jr. |
| 3,823,790 A * | 7/1974 | Richison et al. ............. 180/6.7 |
| 3,860,264 A | 1/1975 | Douglas et al. |
| 3,872,945 A | 3/1975 | Hickman et al. |
| 3,952,822 A | 4/1976 | Udden et al. |
| 4,018,440 A | 4/1977 | Deutsch |
| 4,062,558 A | 12/1977 | Wasserman |
| 4,076,270 A | 2/1978 | Winchell |
| 4,088,199 A | 5/1978 | Trautwein |
| 4,094,372 A | 6/1978 | Notter |
| 4,109,741 A | 8/1978 | Gabriel |
| 4,111,445 A | 9/1978 | Haibeck |
| 4,151,892 A | 5/1979 | Francken |
| 4,222,449 A | 9/1980 | Feliz |
| 4,264,082 A | 4/1981 | Fouchey, Jr. |
| 4,266,627 A | 5/1981 | Lauber |
| 4,293,052 A | 10/1981 | Daswick et al. |
| 4,325,565 A | 4/1982 | Winchell |
| 4,354,569 A | 10/1982 | Eichholz |
| 4,363,493 A | 12/1982 | Veneklasen |
| 4,373,600 A | 2/1983 | Buschbom et al. |
| 4,375,840 A | 3/1983 | Campbell |
| 4,510,956 A | 4/1985 | King |
| 4,556,229 A * | 12/1985 | Bihler et al. ................. 180/8.2 |
| 4,560,022 A | 12/1985 | Kassai |
| 4,566,707 A | 1/1986 | Nitzberg |
| 4,571,844 A | 2/1986 | Komasaku et al. |
| 4,624,469 A | 11/1986 | Bourne, Jr. |
| 4,657,272 A | 4/1987 | Davenport |
| 4,685,693 A | 8/1987 | Vadjunec |
| 4,709,772 A | 12/1987 | Brunet |
| 4,740,001 A | 4/1988 | Torleumke |
| 4,746,132 A | 5/1988 | Eagan |
| 4,770,410 A | 9/1988 | Brown |
| 4,786,069 A | 11/1988 | Tang |
| 4,790,400 A | 12/1988 | Sheeter |
| 4,790,548 A | 12/1988 | Decelles et al. |
| 4,794,999 A | 1/1989 | Hester |
| 4,798,255 A | 1/1989 | Wu |
| 4,802,542 A | 2/1989 | Houston et al. |
| 4,809,804 A | 3/1989 | Houston et al. |
| 4,834,200 A | 5/1989 | Kajita |
| 4,863,182 A | 9/1989 | Chern |
| 4,867,188 A | 9/1989 | Reid |
| 4,869,279 A | 9/1989 | Hedges |
| 4,874,055 A | 10/1989 | Beer |
| 4,890,853 A | 1/1990 | Olson |
| 4,919,225 A | 4/1990 | Sturges |
| 4,953,851 A | 9/1990 | Sherlock et al. |
| 4,984,754 A | 1/1991 | Yarrington |
| 4,985,947 A | 1/1991 | Ethridge |
| 4,998,596 A | 3/1991 | Miksitz |
| 5,002,295 A | 3/1991 | Lin |
| 5,011,171 A | 4/1991 | Cook |
| 5,052,237 A | 10/1991 | Reimann |
| 5,111,899 A | 5/1992 | Reimann |
| 5,158,493 A | 10/1992 | Morgrey |
| 5,168,947 A | 12/1992 | Rodenborn |
| 5,171,173 A | 12/1992 | Henderson et al. |
| 5,186,270 A | 2/1993 | West |
| 5,221,883 A | 6/1993 | Takenaka et al. |
| 5,241,875 A | 9/1993 | Kochanneck |
| 5,248,007 A | 9/1993 | Watkins et al. |
| 5,314,034 A | 5/1994 | Chittal |
| 5,350,033 A | 9/1994 | Kraft |
| 5,366,036 A | 11/1994 | Perry |
| 5,701,965 A | 12/1997 | Kamen et al. |
| 5,701,968 A | 12/1997 | Wright-Ott et al. |
| 5,775,452 A | 7/1998 | Patmont |
| 5,791,425 A | 8/1998 | Kamen et al. |
| 5,794,730 A | 8/1998 | Kamen |
| 5,971,091 A | 10/1999 | Kamen et al. |
| 5,975,225 A | 11/1999 | Kamen et al. |
| 6,003,624 A | 12/1999 | Jorgensen et al. |
| 6,125,957 A | 10/2000 | Kauffmann |
| 6,302,230 B1 * | 10/2001 | Kamen et al. ................. 180/21 |

FOREIGN PATENT DOCUMENTS

| | | | |
|---|---|---|---|
| DE | 3411489 A1 | 10/1984 | |
| DE | 298 08 091 U1 | 10/1998 | |
| DE | 298 08 096 U1 | 10/1998 | |
| EP | 0 109 927 | 7/1984 | |
| EP | 0 193 473 | 9/1986 | |
| EP | 0 537 698 A1 | 4/1993 | |
| FR | 980 237 | 5/1951 | |
| FR | 2 502 090 | 9/1982 | |
| GB | 152664 | 2/1922 | |
| GB | 1213930 | 11/1970 | |
| GB | 2 139 576 A | 11/1984 | |
| JP | 52-44933 | 10/1975 | |
| JP | 57-87766 | 6/1982 | |
| JP | 57-110569 | 7/1982 | |
| JP | 59-73372 | 4/1984 | |
| JP | 62-12810 | 7/1985 | |
| JP | 0255580 | 12/1985 | |
| JP | 61-31685 | 2/1986 | |
| JP | 63-305082 | 12/1988 | |
| JP | 6-105415 | 12/1989 | |
| JP | 2-190277 | 7/1990 | |
| JP | 4-201793 * | 7/1992 | ................. 180/7.1 |
| JP | 6-171562 | 12/1992 | |
| JP | 5-213240 | 8/1993 | |
| JP | 7255780 | 3/1995 | |
| WO | WO 86/05752 | 10/1986 | |
| WO | WO 89/06117 | 7/1989 | |
| WO | WO 96/23478 | 8/1996 | |

OTHER PUBLICATIONS

Yamafuji et al. *Synchronous Steering Control of a Parallel Bicycle, Paper Read at Meeting of Japan Society of Mechanical Engineering* (Series C), vol. 55, No. 513, pp. 1229–1234 (May, 1989).

Momoi & Yamafuji *Motion control of the Parallel Bicycle–Type Mobile Robot Composed of a Triple Inverted Pendulum, Paper Read at Meeting of Japan Society of Mechanical Engineering* (Series C), vol. 57, No. 541, pp. 154–159 (Sep., 1991).

Kawaji, S., *Stabilization of Unicycle Using Spinning Motion, Denki Gakkai Ronbushi, D*, vol. 107, Issue 1, Japan (1987), pp. 21–28.

Schoonwinkel, A., *Design and Test of a Computer–Stabilized Unicycle*, Stanford University (1988), UMI Dissertation Services.

Vos, D., *Dynamics and Nonlinear Adaptive Control of an Autonomous Unicycle*, Massachusetts Institute of Technology, 1989.

Vos, D., *Nonlinear Control of an Autonomous Unicycle Robot: Practical Isues*, Massachusetts Institute of Technology, 1992.

Koyanagi et al., *A Wheeled Inverse Pendulum Type Self–Contained Mobile Robot and its Posture Control and Vehicle Control, The Society of Instrument and Control Engineers*, Special issue of the $31^{st}$ SICE Annual Conference, Japan 1992, pp. 13–16.

Koyanagi et al., *A Wheeled Inverse Pendulum Type Self–Contained Mobile Robot*, The Society of Instrument and Control Engineers, Special issue of the 31$^{st}$ SICE Annual Conference, Japan 1992, pp. 51–56.

Koyanagi et al., *A Wheeled Inverse Pendulum Type Self–Contained Mobile Robot and its Two Dimensional Trajectory Control*, Proceedings of the Second International Symposium on Measurement and Control in Robotics, Japan 1992, pp. 891–898.

Watson Industries, Inc., Vertical Reference Manual ADS–C132–1A, 1992, pp. 3–4.

News article *Amazing Wheelchair Goes Up and Down Stairs*.

Osaka et al., *Systems and Control*, vol. 25, No. 3, Japan 1981, pp. 159–166 (Abstract Only).

Roy et al., *Five–Wheel Unicycle System, Medical & Biological Engineering & Computing*, vol. 23, No. 6, United Kingdom 1985, pp. 593–596.

Kawaji, S., *Stabilization of Unicycle Using Spinning Motion*, Denki Gakkai Ronbushi, D, vol. 107, Issue 1, Japan 1987, pp. 21–28 (Abstract Only).

Schoonwinkel, A., *Design and Test of a Computer–Stabilized Unicycle, Dissertation Abstracts International*, vol. 49/03–B, Stanford University 1988, pp. 890–1294 (Abstract only).

Vos et al., *Dynamics and Nonlinear Adaptive Control of an Autonomous Unicycle—Theory and Experiment, American Institute of Aeronautics and Astronautics*, A90–26772 10–39, Washington, D.C. 1990, pp. 487–494 (Abstract only).

TECKNICO'S Home Page, *Those Amazing Flying Machines*, http://www.swiftsite.com/technico.

Stew's Hovercraft Page, http://www.stewcam.com/hovercraft.html.

* cited by examiner

PERSONAL MOBILITY VEHICLES AND METHODS

This application is a divisional application of U.S. application Ser. No. 09/325,976, filed Jun. 4, 1999, which is a continuation in part of U.S. application Ser. No. 08/479,901, filed Jun. 7, 1995, now issued as U.S. Pat. No. 5,975,225, which is a continuation in part of U.S. application Ser. No. 08/384,705, filed Feb. 3, 1995, now issued as U.S. Pat. No. 5,971,091, which is a continuation in part of U.S. application Ser. No. 08/250,693, filed May 27, 1994, now issued as U.S. Pat. No. 5,701,965, which in turn is a continuation in part of U.S. application Ser. No. 08/021,789, filed Feb. 24, 1993, now abandoned.

TECHNICAL FIELD

The present invention pertains to vehicles and methods for transporting individuals, and more particularly to balancing vehicles and methods for transporting individuals over ground having a surface that may be irregular.

BACKGROUND ART

A wide range of vehicles and methods are known for transporting human subjects. Typically, such vehicles rely upon static stability, being designed so as to be stable under all foreseen conditions of placement of their ground-contacting members. Thus, for example, the gravity vector acting on the center of gravity of an automobile passes between the points of ground contact of the automobile's wheels, the suspension keeping all wheels on the ground at all times, and the automobile is thus stable. Another example of a statically stable vehicle is the stair-climbing vehicle described in U.S. Pat. No. 4,790,548 (Decelles et al.).

SUMMARY OF THE INVENTION

The invention provides, in a preferred embodiment, a device for carrying a standing person with a desired unassisted motion over a surface. The device has a platform which supports a payload, a ground-contacting module coupled to the platform that has, in turn, two laterally disposed and separately rotatable ground-contacting members. Additionally, the device has a motorized drive arrangement that causes, when powered, motion of the ground-contacting module and platform. The ground-contacting members may be wheels, and the device may additionally provide for differential control of the wheels.

In accordance with another embodiment of the invention, there is provided a device for carrying a user in a standing position, where a drive delivers power to a ground-contacting module in a manner, responsive to user input, if any, as to prevent the platform and user from falling. The device may include a motor and a controller which receives information as to whether the device is falling.

In accordance with yet other embodiments of the present invention, a balancing device is provided for carrying a user in a standing position, and a balancing device is provided that may be braked by leaning of a rider. In further alternate embodiments of the invention, a device is provided for carrying a standing user that is steered by differential operation of the ground-contacting members, and a balancing device is provided that is steered by differential operation of the ground-contacting members.

In accordance with other embodiments of the invention, a device is provided to carry a standing user where the device has a ground-contacting module having an area substantially equal to the characteristic area of the standing user or a characteristic linear dimension comparable to the shoulder width of the user. Balancing devices are provided, in accordance with other embodiments, that convey a user to conduct an activity such as a work or recreational activity.

In accordance with an another alternate embodiment of the invention, a balancing device is provided for conveying a user, where ground contact is provided by clusters of wheels. The various balancing devices may be controlled by leaning of the user or by the orientation of the user with respect to the platform supporting the user. Additionally, a toy vehicle is provided in accordance with an alternate embodiment of the invention, that has a chassis and a balancing ground-contacting module coupled to the chassis, the ground-contacting module having two clusters of wheels.

In accordance with an alternate embodiments of the invention, a method is provided for braking a vehicle having a motorized drive. The method has the steps of leaning back relative to the vehicle and using the motor to slow the vehicle in response to the leaning. In accordance with another embodiment of the invention, a method is provided for causing a vehicle having a motorized drive to move in a first fore-aft direction. The steps of the method are, first, providing an input specifying a desired motion in the first fore-aft direction, then causing the vehicle to move in a direction opposite to the first fore-aft direction in response to the input, and, finally, after the preceding step has been performed, accelerating in the first direction. Further alternate embodiments of the invention provide methods for employing each of the devices provided in the foregoing embodiments of the invention.

BRIEF DESCRIPTION OF THE DRAWINGS

The invention will be more readily understood by reference to the following description, taken with the accompanying drawings, in which.

DETAILED DESCRIPTION OF SPECIFIC EMBODIMENTS

Figure 1:
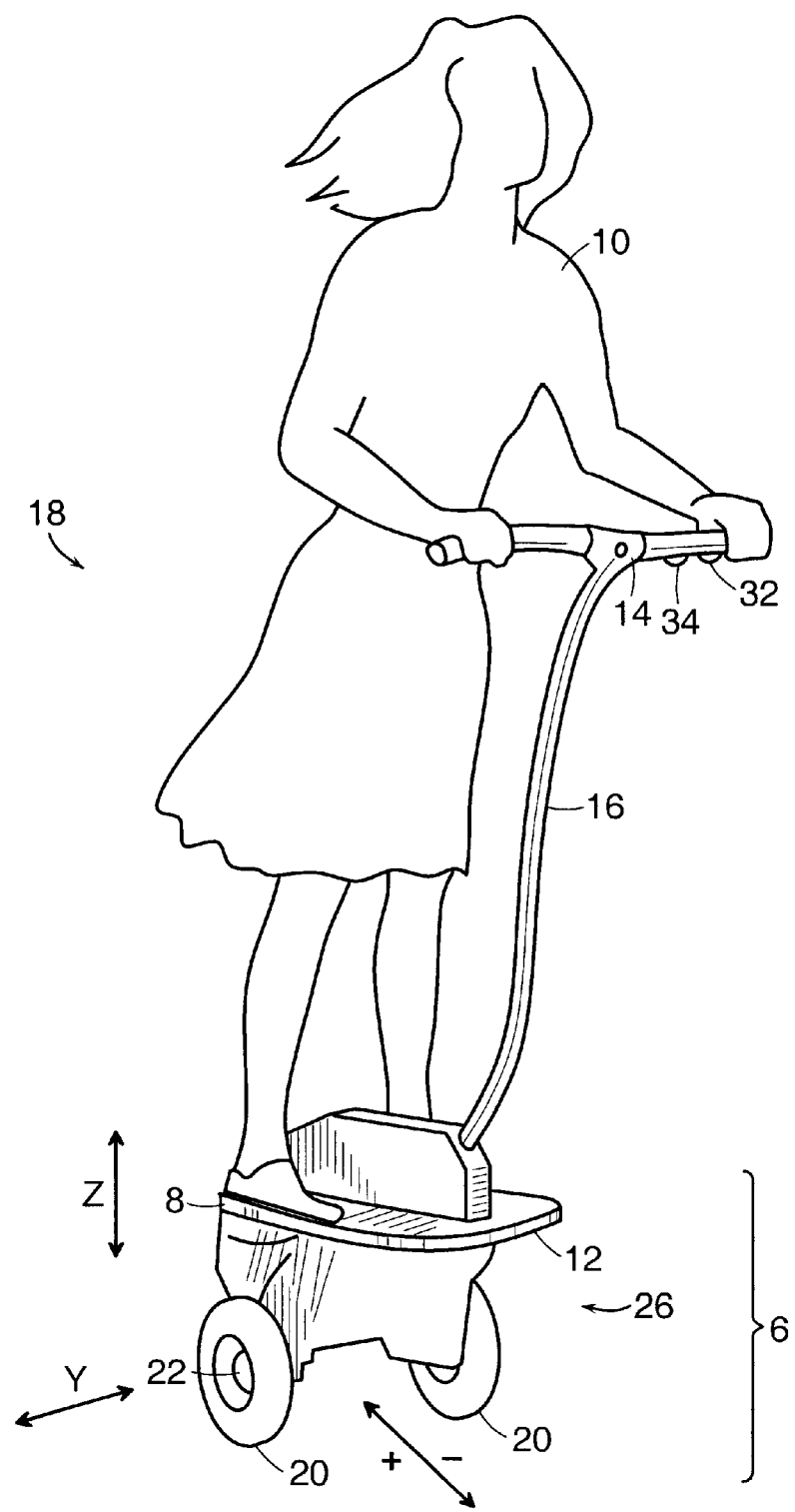
FIG. 1 is a side view of a personal vehicle lacking a stable static position, in accordance with a preferred embodiment of the present invention, for supporting or conveying a subject who remains in a standing position thereon.

The subject matter of this application is related to that of U.S. application Ser. No. 08/479,901, filed Jun. 7, 1995, now allowed, which is a continuation in part of U.S. application Ser. No. 08/384,705, filed Feb. 3, 1995, now allowed, which is a continuation in part of U.S. application Ser. No. 08/250,693, filed May 27, 1994, now issued as U.S. Pat. No. 5,701,965, which in turn is a continuation in part of U.S. application Ser. No. 08/021,789, filed Feb. 24, 1993, now abandoned. Each of these related applications is incorporated herein by reference in its entirety.

An alternative to operation of a statically stable vehicle is that dynamic stability may be maintained by action of the user, as in the case of a bicycle or motorcycle or scooter, or, in accordance with embodiments of the present invention, by a control loop, as in the case of the human transporter described in U.S. Pat. No. 5,701,965. The invention may be implemented in a wide range of embodiments. A characteristic of many of these embodiments is the use of a pair of laterally disposed ground-contacting members to suspend the subject over the surface with respect to which the subject is being transported. The ground or other surface, such as a floor, over which a vehicle in accordance with the invention is employed may be referred to generally herein as the "ground." The ground-contacting members are typically motor-driven. In many embodiments, the configuration in which the subject is suspended during locomotion lacks inherent stability at least a portion of the time with respect to a vertical in the fore-aft plane but is relatively stable with respect to a vertical in the lateral plane.

Some embodiments of the invention invoke the concept of primary wheels. The term "primary wheels," as used in this description and in any appended claims, refers to a minimum set of a vehicle's wheels on which the vehicle is capable of operating stably. More generally, the term "primary ground-contacting members" allows for a more general class of members, that includes but is not limited to wheels. Hence, as used in this description and in any appended claims, "primary ground-contacting members" refers to a minimum set of a vehicle's ground-contacting members on which the vehicle is capable of operating stably. Other ground-contacting members may include, without limitation: arcuate sections of a wheel, clusters of wheels, treads, etc.

In various embodiments of the invention, fore-aft stability may be achieved by providing a control loop, in which one or more motors are included, for operation of a motorized drive in connection with the ground-contacting members. As described below, a pair of ground-contacting members may, for example, be a pair of wheels or a pair of wheel clusters. In the case of wheel clusters, each cluster may include a plurality of wheels. Each ground-contacting member, however, may instead be a plurality (typically a pair) of axially-adjacent, radially supported and rotatably mounted arcuate elements. In these embodiments, the ground-contacting members are driven by the motorized drive in the control loop in such a way as to maintain, when the vehicle is not in locomotion, the center of mass of the vehicle above the point of contact of the ground-contacting members with the ground, regardless of disturbances and forces operative on the vehicle.

A ground-contacting member typically has a "point" (actually, a region) of contact or tangency with the surface over which the vehicle is traveling or standing. Due to the compliance of the ground-contacting member, the "point" of contact is actually an area, where the region of contact may also be referred to as a contact patch. The weight of the vehicle is distributed over the contact region, giving rise to a distribution of pressures over the region, with the center of pressure displaced forward during forward motion. The distribution of pressures is a function both of the composition and structure of the wheel, the rotational velocity of the wheel, the torque applied to the wheel, and thus of the frictional forces acting on the wheel.

Figure 16:
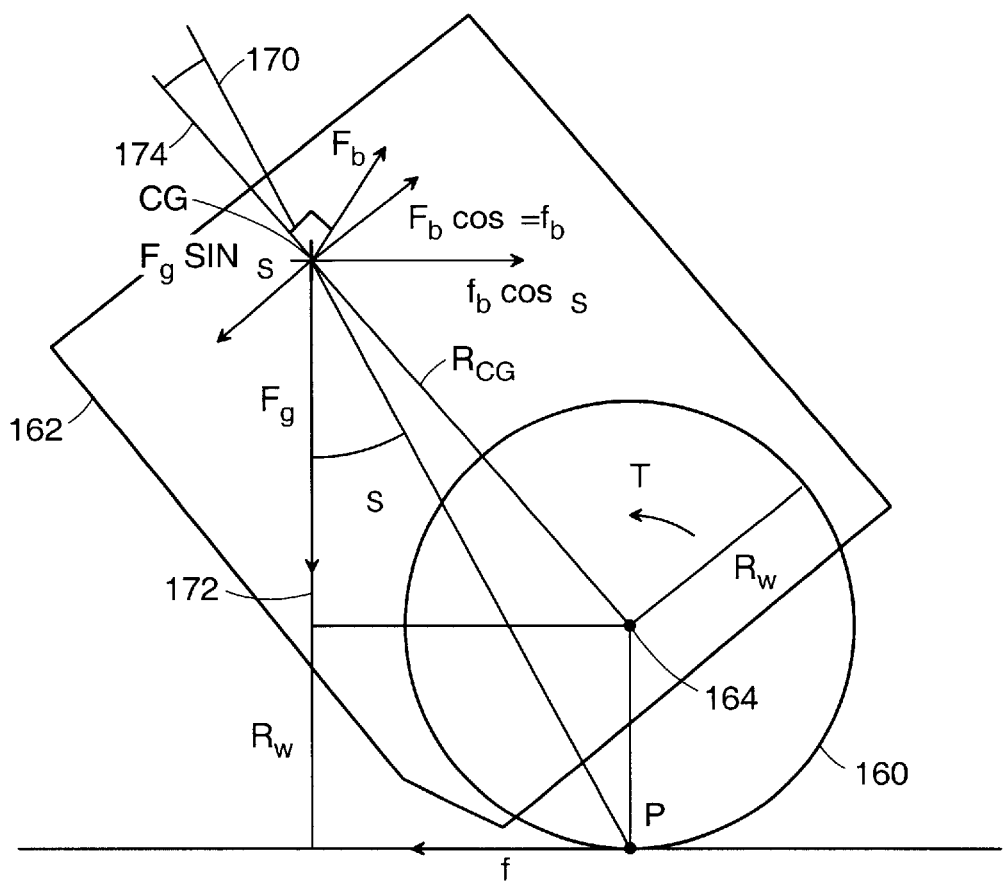
FIG. 16 shows an illustrative diagram of an idealized balancing vehicle with a rigid wheel in motion at a constant velocity across a flat surface.

A force in the direction of motion is required to overcome rolling friction (and other frictional forces, including air resistance). Gravity may be used, in accordance with preferred embodiments of the invention, to provide a torque about the point of contact with the surface in a direction having a component in the sense of desired motion. Referring to FIG. 16, to illustrate these principles, a diagram is shown of the forces acting on a vehicle that locomotes with constant velocity v on a single wheel over a flat surface. The principles now discussed may readily be generalized to operation on a sloped surface and to accommodate any other external forces that might be present. Wheel 160 of radius $R_w$ rotates with respect to chassis 162 about axle 164 and contacts the underlying surface at point P. For purposes of illustration only, it is assumed that wheel 160 contacts the surface at a point.

The wheel is driven with respect to the vehicle by a torque T (supplied by a motor, for example) which in turn creates a reaction torque −T on the vehicle. Since the torque acts about the axle 164, the reaction torque corresponds to a force $F_b$ acting at the center of gravity (CG) of the system, including the vehicle and payload, where $F_b=T/R_{CG}$, where $R_{CG}$ is the distance between the axle and the CG of the system. The line 170 from the CG to point P is at an angle $\theta_s$ relative to the vertical 172.

The rolling friction, f, acting on the wheel at point P, is proportional to the velocity v of the rim of the wheel, with the proportionality expressed as f=v. For constant velocity to be maintained, this force f must be exactly canceled. Consequently, with gravity providing the force, the condition that must be satisfied is:

$$f_b \cos \theta_s = f, \tag{Eqn. 1}$$

where $f_b$ is the component of the reaction force acting transverse to axis 174 between the CG and point P. In order to prevent the vehicle from falling, a stability condition must also exist, namely that no net force acts on the CG in a direction transverse to line 170, i.e., there is no net torque about the point of contact P during motion at constant velocity (i.e., in an inertial frame of reference where the point P is fixed). This condition may be expressed as:

$$F_s \sin \theta_s = f_b, \qquad (\text{Eqn. 2})$$

where $F_g \sin \theta_s$ is the "tipping" component of gravity, and $f_b$ is the counter-tipping component of the reactive force on the vehicle caused by wheel rotation ($f_b = F_b \cos \gamma$), and where $\gamma$ is the angle shown line 170 and line 174.

Eqns. 1 and 2 may be combined to yield $F_g \sin \theta_s \cos \theta_s f = \mu v$, thus, in the limit of small angles (where $\sin \theta \approx \theta$), $$\theta_s \approx (\mu/F_g) v, \qquad (\text{Eqn. 3})$$

showing that increasing velocity requires increased lean to overcome the effects of friction. Additionally, a control loop that imposes stability on the system will respond to an increased lean by increasing velocity of the system. While the preceding discussion assumed constant velocity, additional lean beyond that required to overcome the effects of friction will result in acceleration since an additional forward-directed force acts on the CG. Conversely, in order to achieve acceleration (or deceleration) of the vehicle, additional leaning (forward or backward) must be provided in a manner discussed in further detail below.

FIG. 1 shows a simplified embodiment of the invention. A personal transporter is shown and designated generally by numeral 18. A subject 10 stands on a support platform 12 and holds a grip 14 on a handle 16 attached to the platform 12, so that the vehicle 18 of this embodiment may be operated in a manner analogous to a scooter. A control loop may be provided so that leaning of the subject results in the application of torque to wheel 20 about axle 22 thereby causing an acceleration of the vehicle. Vehicle 18, however, is statically unstable, and, absent operation of the control loop to maintain dynamic stability, subject 10 will no longer be supported in a standing position and will fall from platform 12. Different numbers of wheels or other ground-contacting members may advantageously be used in various embodiments of the invention as particularly suited to varying applications. Thus, as described in greater detail below, the number of ground-contacting members may be any number equal to, or greater than, one. For many applications, the dimensions of platform 12, and indeed of the entire ground-contacting module, designated generally by numeral 6, are advantageously comparable to the dimensions of the footprint or shoulder width of user 10. Thus transporter 18 may advantageously be used as a mobile work platform or a recreational vehicle such as a golf cart, or as a delivery vehicle.

Transporter 18 may be operated in a station-keeping mode, wherein balance is maintained substantially at a specified position. Additionally, transporter 18, which may be referred to herein, without limitation, as a "vehicle," may also maintain a fixed position and orientation when the user 10 is not on platform 12. This mode of operation, referred to as a "kickstand" mode, prevents runaway of the vehicle and provides for the safety of the user and other persons. A forceplate 8 or other sensor, disposed on platform 12, detects the presence of a user on the vehicle.

Figure 2:
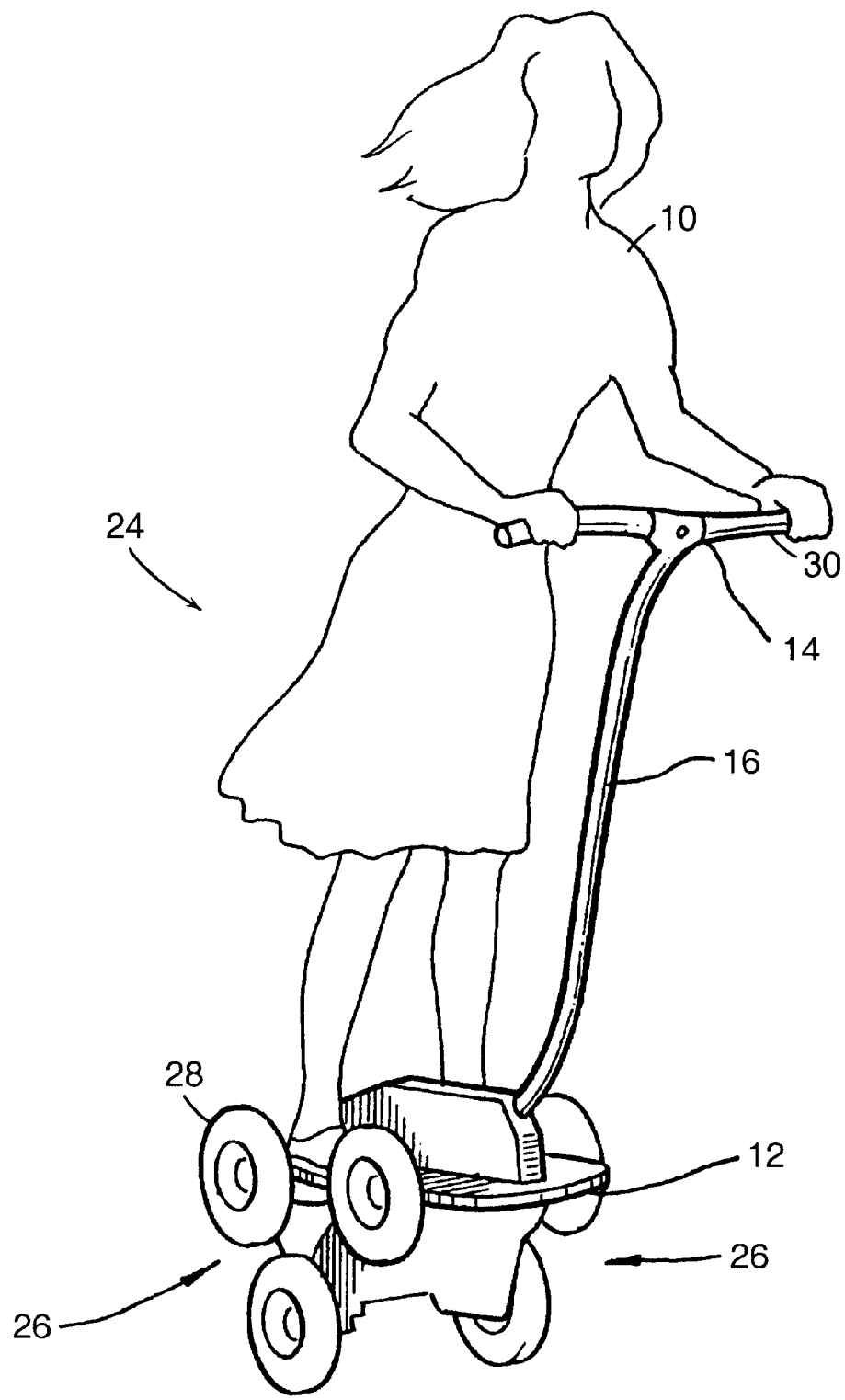
FIG. 2 is a perspective view of a further personal vehicle lacking a stable static position, in accordance with an alternate embodiment of the present invention.

Another embodiment of a balancing vehicle in accordance with the present invention is shown in FIG. 2 and designated generally by numeral 24. Personal vehicle 24 shares the characteristics of vehicle 18 of FIG. 1, namely a support platform 12 for supporting subject 10 and grip 14 on handle 16 attached to platform 12, so that the vehicle 18 of this embodiment may also be operated in a manner analogous to a scooter. FIG. 2 shows that while vehicle 24 may have clusters 26 each cluster having a plurality of wheels 28, vehicle 24 remains statically unstable and, absent operation of a control loop to maintain dynamic stability, subject 10 will no longer be supported in a standing position and will fall from platform 12. In the embodiment of FIG. 2, as in the embodiment of FIG. 1, the primary ground-contacting members are a pair of wheels. Supplemental ground-contacting members may be used in stair climbing and descending or in traversing other obstacles. In one mode of operation, for example, it is possible to rotate clusters 26 so that two wheels on each of the clusters are simultaneously in contact with the ground. Stair climbing and flat-terrain locomotion may both be achieved, however, with the vehicle supported on only a single set of primary ground-contacting members.

Operation of the balancing transporter will be described with reference to the set of coordinate axes shown in FIG. 1. Gravity defines the vertical axis z, while the axis coincident with the wheel axis 22 may be used to define a lateral axis y, and a fore-aft axis x is defined by the forward direction of motion of the vehicle. The plane defined by the vertical axis z and the lateral axis y will sometimes be referred to as the "lateral plane", and the plane defined by the fore-aft axis x and the vertical axis z will sometimes be referred to as the "fore-aft plane". Directions parallel to the axes x and y are called the fore-aft and lateral directions respectively. It can be seen that the vehicle, when relying on the pair of wheels 20 for contacting the ground, is inherently unstable with respect to a vertical in the fore-aft direction, but is relatively stable with respect to a vertical in the lateral direction. In other embodiments of the invention described below, the vehicle may also be unstable with respect to yaw about the x axis.

The axes may also be defined with respect to platform 12 in cases such as where the ground-contacting member is a uniball, as described below with reference to FIG. 15.

Figure 3:
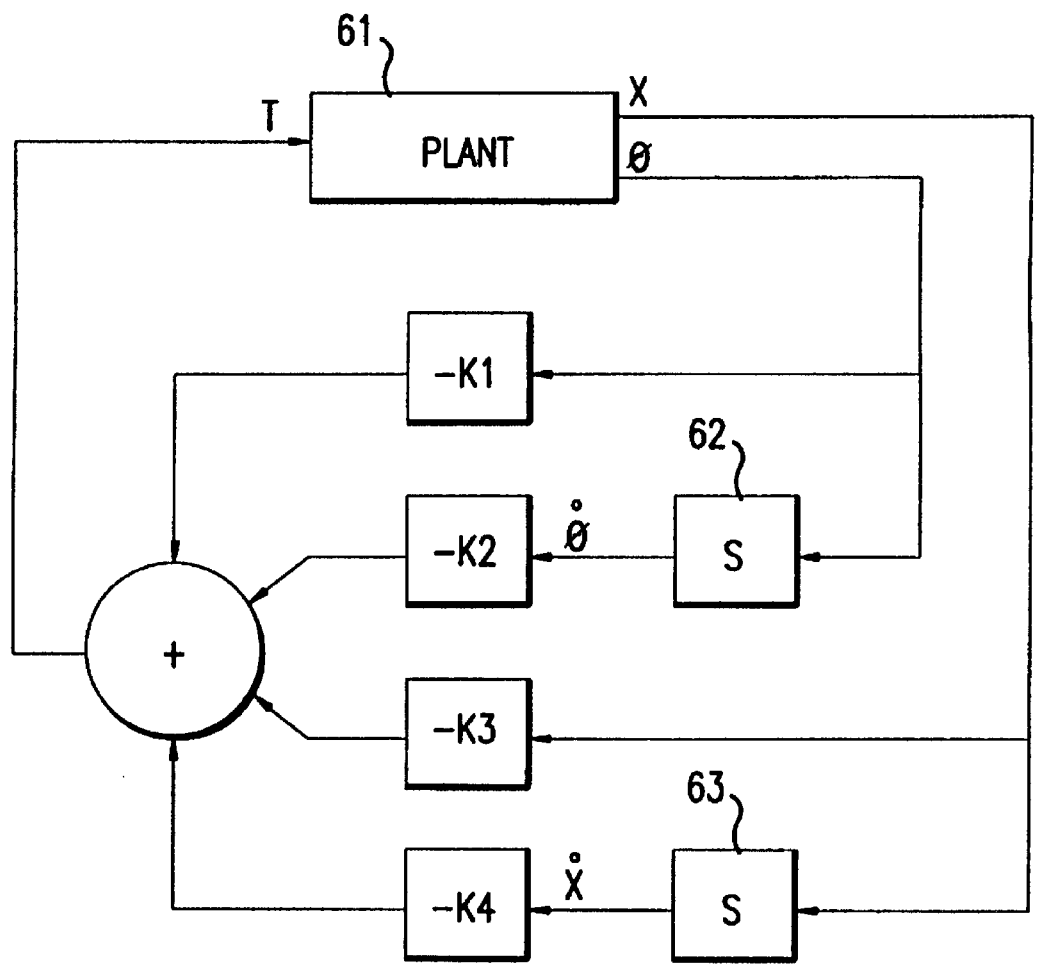
FIG. 3 illustrates the control strategy for a simplified version of FIG. 1 to achieve balance using wheel torque.

A simplified control algorithm for achieving balance in the embodiment of the invention according to FIG. 1 when the wheels are active for locomotion is shown in the block diagram of FIG. 3. The plant 61 is equivalent to the equations of motion of a system with a ground contacting module driven by a single motor, before the control loop is applied. T identifies the wheel torque. The remaining portion of the figure is the control used to achieve balance. The boxes 62 and 63 indicate differentiation. To achieve dynamic control to insure stability of the system, and to keep the system in the neighborhood of a reference point on the surface, the wheel torque T in this embodiment is governed by the following simplified control equation:

$$T = K_1(\theta + \theta_1) + K_2\dot{\theta} + K_3(x + x_0) + K_4\dot{x}, \qquad (\text{Eqn. 4})$$

where:

T denotes a torque applied to a ground-contacting element about its axis of rotation;

θ is a quantity corresponding to the lean of the entire system about the ground contact, with $\theta_0$ representing the magnitude of a system pitch offset, all as discussed in detail below;

x identifies the fore-aft displacement along the surface relative to a fiducial reference point, with $x_0$ representing the magnitude of a specified fiducial reference offset;

a dot over a character denotes a variable differentiated with respect to time; and a subscripted variable denotes a specified offset that may be input into the system as described below; and $K_1$, $K_2$, $K_3$, and $K_4$ are gain coefficients that may be configured, either in design of the system or in real-time, on the basis of a current operating mode and operating conditions as well as preferences of a user. The gain coefficients may be of a positive, negative, or zero magnitude, affecting thereby the mode of operation of the vehicle, as discussed below. The gains $K_1$, $K_2$, $K_3$, and $K_4$ are dependent upon the physical parameters of the system and other effects such as gravity. The simplified control algorithm of FIG. 3 maintains balance and also proximity to the reference point on the surface in the presence of disturbances such as changes to the system's center of mass with respect to the reference point on the surface due to body motion of the subject or contact with other persons or objects.

The effect of $\theta_0$ in the above control equation (Eqn. 4) is to produce a specified offset $-\theta_0$ from the non-pitched position where $\theta=0$. Adjustment of $\theta_0$ will adjust the vehicle's offset from a non-pitched position. As discussed in further detail below, in various embodiments, pitch offset may be adjusted by the user, for example, by means of a thumb wheel 32, shown in FIG. 1. An adjustable pitch offset is useful under a variety of circumstances. For example, when operating the vehicle on an incline, it may be desirable for the operator to stand erect with respect to gravity when the vehicle is stationary or moving at a uniform rate. On an upward incline, a forward torque on the wheels is required in order to keep the wheels in place. This requires that the user push the handle further forward, requiring that the user assume an awkward position. Conversely, on a downward incline, the handle must be drawn back in order to remain stationary. Under these circumstances, $\theta_0$ may advantageously be manually offset to allow control with respect to a stationary pitch comfortable to the user.

The size of $K_3$ will determine the extent to which the vehicle will seek to return to a given location. With a non-zero $K_3$, the effect of $x_0$ is to produce a specified offset $-x_0$ from the fiducial reference by which x is measured. When $K_3$ is zero, the vehicle has no bias to return to a given location. The consequence of this is that if the vehicle is caused to lean in a forward direction, the vehicle will move in a forward direction, thereby maintaining balance. Such a configuration is discussed further below.

The term "lean" is often used with respect to a system balanced on a single point of a perfectly rigid member. In that case, the point (or line) of contact between the member and the underlying surface has zero theoretical width. In that case, furthermore, lean may refer to a quantity that expresses the orientation with respect to the vertical (i.e., an imaginary line passing through the center of the earth) of a line from the center of gravity (CG) of the system through the theoretical line of ground contact of the wheel. While recognizing, as discussed above, that an actual ground-contacting member is not perfectly rigid, the term "lean" is used herein in the common sense of a theoretical limit of a rigid ground-contacting member. The term "system" refers to all mass caused to move due to motion of the ground-contacting elements with respect to the surface over which the vehicle is moving.

"Stability" as used in this description and in any appended claims refers to the mechanical condition of an operating position with respect to which the system will naturally return if the system is perturbed away from the operating position in any respect.

In order to accommodate two wheels instead of the one-wheel system illustrated for simplicity in FIG. 3, separate motors may be provided for left and right wheels of the vehicle and the torque desired from the left motor and the torque desired from the right motor can be calculated separately in the general manner described below in connection with FIG. 7. Additionally, tracking both the left wheel motion and the right wheel motion permits adjustments to be made to prevent unwanted turning of the vehicle and to account for performance variations between the two drive motors.

Figure 4:
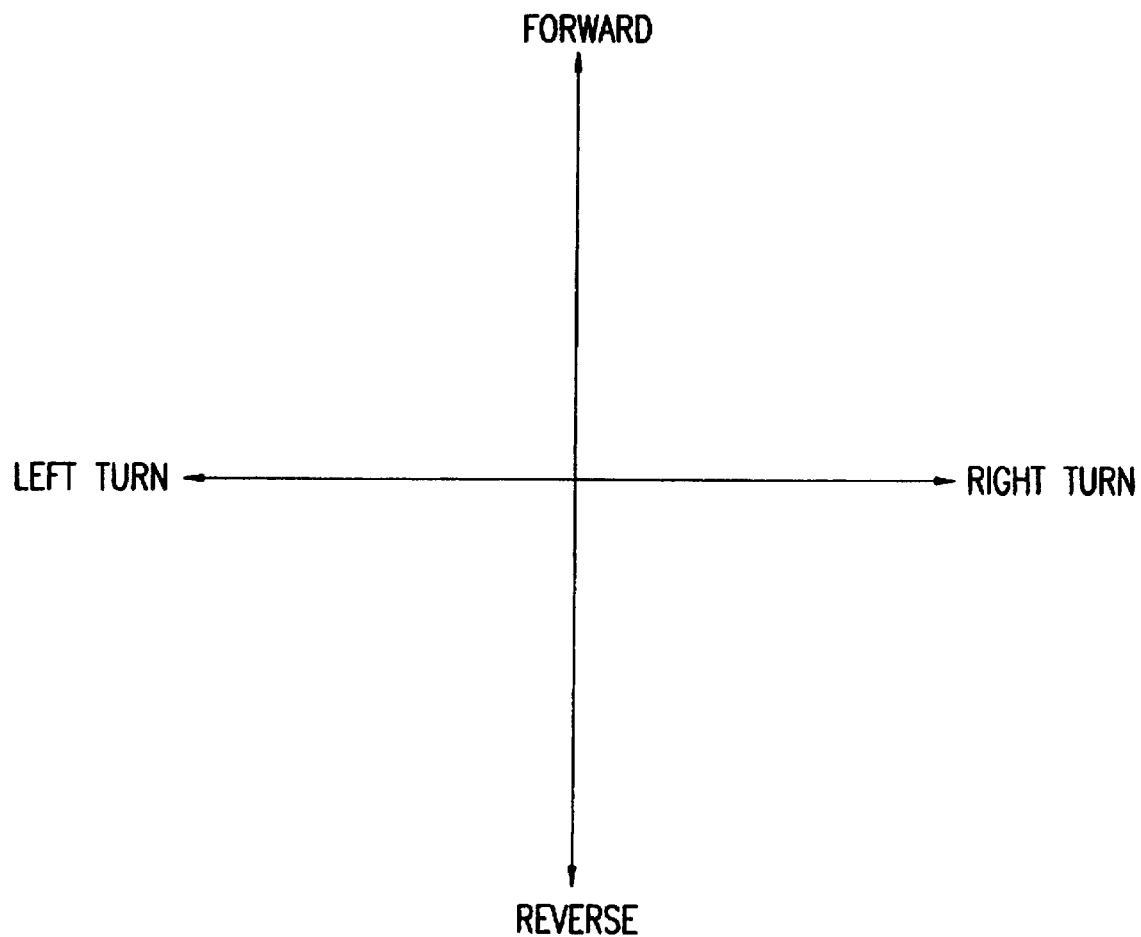
FIG. 4 illustrates diagrammatically the operation of joystick control of the wheels of the embodiment of FIG. 1.

In cases where gain $K_3$ is zero, a user control input such as a joystick may be used to adjust the torques of each motor. The joystick has axes indicated in FIG. 4. In operation of this embodiment, forward motion of the joystick is used to cause forward motion of the vehicle, and reverse motion of the joystick causes backward motion of the vehicle. A left turn similarly is accomplished by leftward motion of the joystick. For a right turn, the joystick is moved to the right. The configuration used here permits the vehicle to turn in place when the joystick is moved to the left or to the right, by causing rotation of left and right motors, and hence left and right wheels, at equal rates in opposite senses of rotation. With respect to forward and reverse motion an alternative to the joystick is simply leaning forward or backward (in a case where $K_3$ is zero), since the pitch sensor (measuring $\theta$) would identify a pitch change that the system would respond to, leading to forward or reverse motion, depending on the direction of lean. Alternatively, control strategies based on fuzzy logic can be implemented.

It can be seen that the approach of adjusting motor torques when in the balance mode permits fore-aft stability to be achieved without the necessity of additional stabilizing wheels or struts (although such aids to stability may also be provided). In other words, stability is achieved dynamically, by motion of the components of the vehicle (in this case constituting the entire vehicle) relative to the ground.

Figure 5:
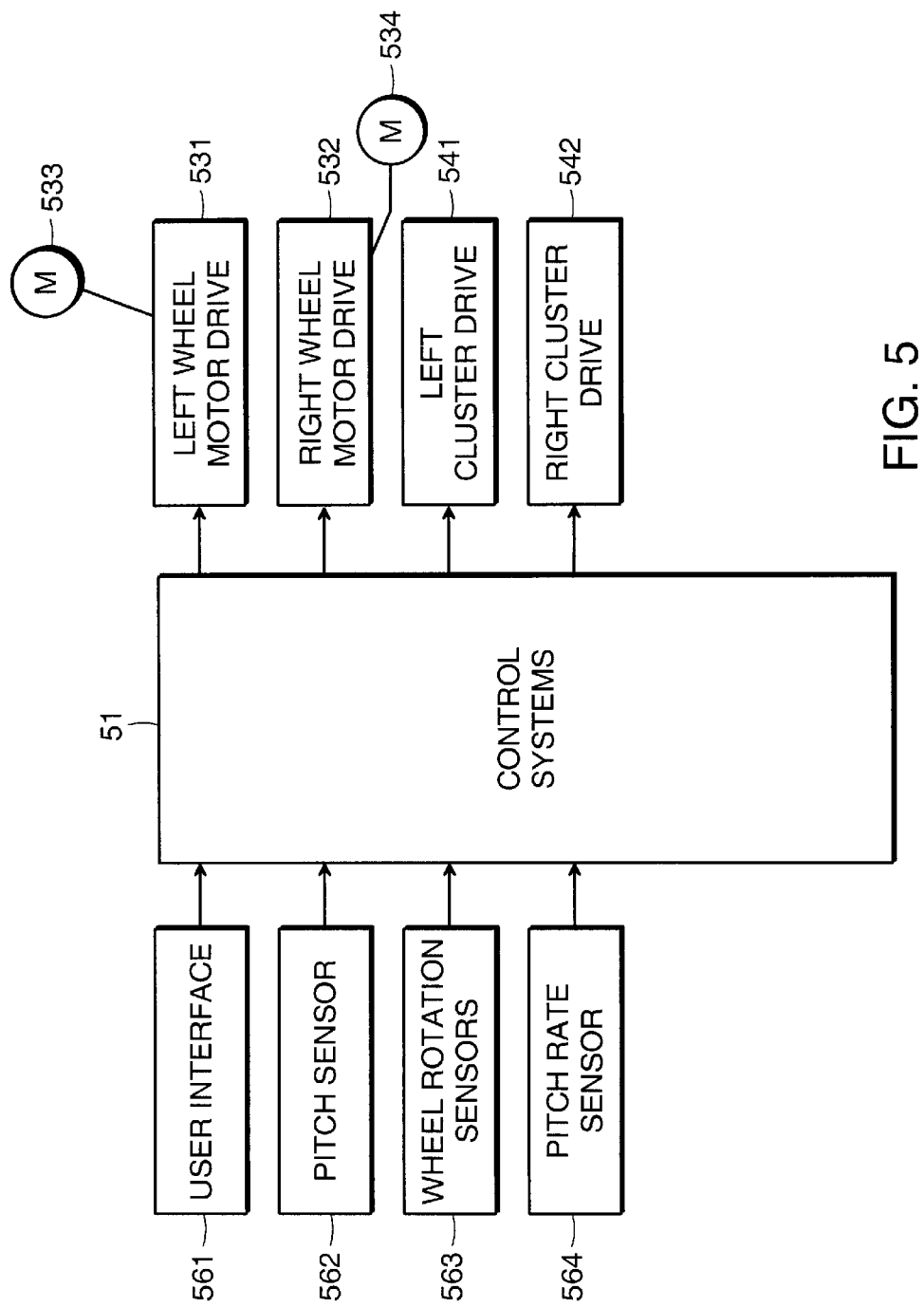
FIG. 5 is a block diagram showing generally the nature of sensors, power and control with the embodiment of FIG. 1.

In the block diagram of FIG. 5 it can be seen that a control system 51 is used to control the motor drives and actuators of the embodiment of FIGS. 1–3 to achieve locomotion and balance. These include motor drives 531 and 532 for left and right wheels respectively. If clusters are present as in the embodiment of FIG. 2, actuators 541 and 542 for left and right clusters respectively. The control system has data inputs including user interface 561, pitch sensor 562 for sensing fore-aft pitch, and wheel rotation sensors 563, and pitch rate sensor 564. Pitch rate and pitch may be derived through the use of gyroscopes or inclinometers, for example, alone or in combination.

A grip 14 (shown in FIG. 1) may be conveniently provided with a thumb wheel 32 (shown in FIG. 1) or thumb-operated joystick for directional control, although other methods of control may also be used. Thumb wheel 32 may serve multiple control purposes as will now be described.

In accordance with other embodiments of the invention, handle 16 and grip 14 may be absent altogether, and the platform 12 may be equipped with sensors, such as force-plate 8, for example, to detect leaning of the subject. Indeed, as described in connection with FIG. 5 and as further described below, the pitch of the vehicle is sensed and may be used to govern operation of the control loop, so that if the subject leans forward, the vehicle will move forward to maintain a desired velocity or to provide desired acceleration. Accordingly, a forward lean of the subject will cause the vehicle to pitch forward and produce forward movement; a backward lean will cause the vehicle to pitch backward and produce backward movement. Appropriate force transducers may be provided to sense leftward and rightward leaning and related controls provided to cause left and right turning as a result of the sensed leaning.

Leaning may also be detected using proximity sensors. Additionally, operation of the vehicle may be governed on the basis of the orientation of the user with respect to the platform.

In a further embodiment, the vehicle may be equipped with a foot- (or force-) actuated switch sensitive to the presence of a user on the vehicle. Thus, for example, the vehicle may be powered automatically upon ascent of a user onto the platform. Conversely, when the user alights from the vehicle, power can be removed and the vehicle disabled. Alternatively, the vehicle may be programmed to enter a dynamic "kickstand" mode in which the vehicle remains balanced in place when the user alights. Thus, the vehicle is ready for the user to resume travel by reboarding the vehicle. Furthermore, the vehicle is thus safely parked while not actively operated by a user aboard the vehicle.

Figure 6:
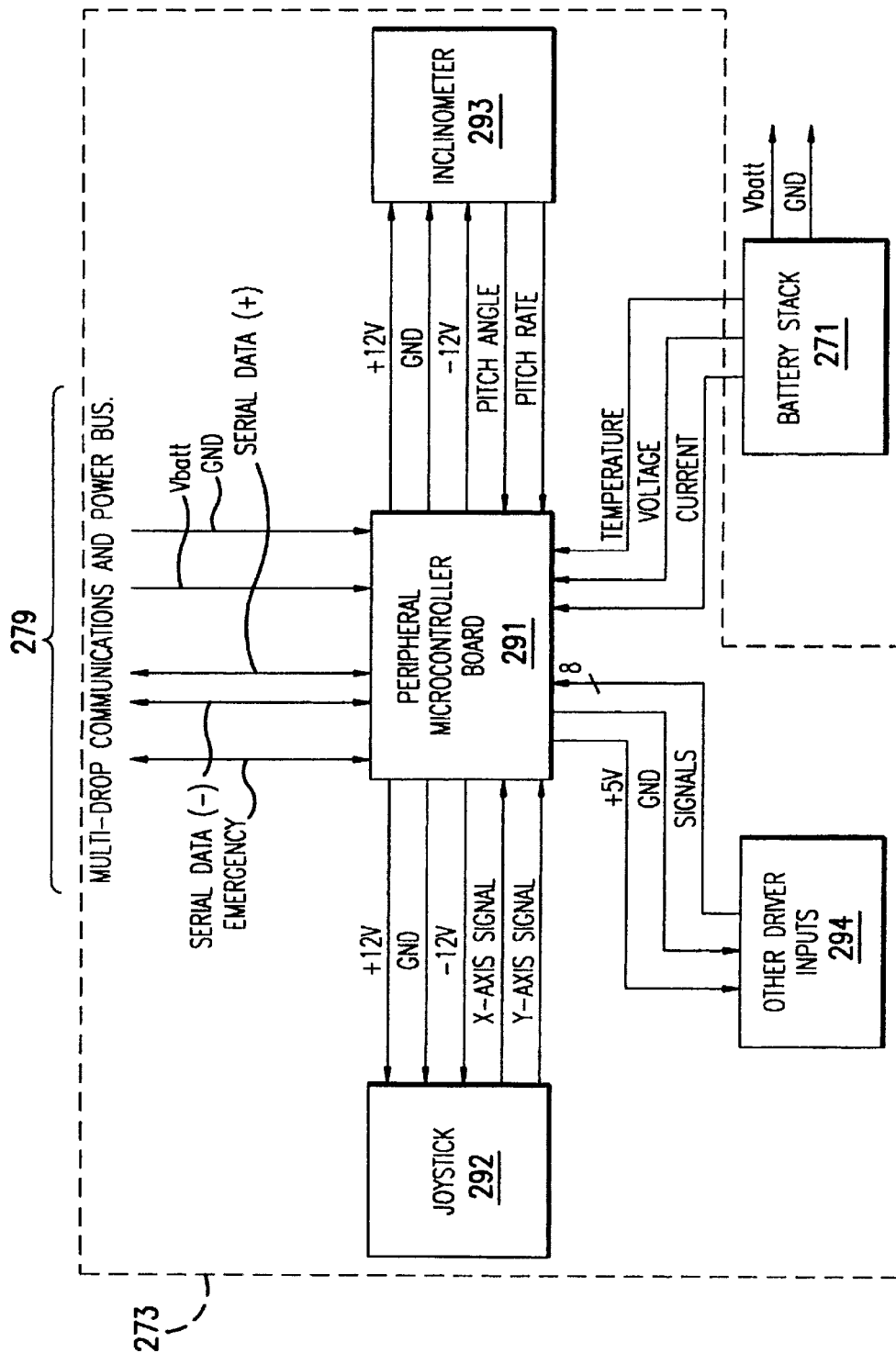
FIG. 6 is a block diagram providing detail of a driver interface assembly.

FIG. 6 is a block diagram providing detail of a driver interface assembly 273. A peripheral microcomputer board 291 receives an input from joystick 292 as well as from inclinometer 293 or another tilt-determining arrangement. The inclinometer provides information signals as to pitch and pitch rate. (The term "inclinometer" as used in this context throughout this description and in the accompanying claims means any device providing an output indicative of pitch or pitch rate, regardless of the arrangement used to achieve the output; if only one of the pitch and pitch rate variables is provided as an output, the other variable can be obtained by suitable differentiation or integration with respect to time.) To permit controlled banking into turns by the vehicle (thereby to increase stability while turning) it is also feasible to utilize a second inclinometer to provide information as to roll and roll rate or, alternatively, the resultant of system weight and centrifugal force. Other inputs 294 may also be desirably provided as an input to the peripheral micro controller board 291. Such other inputs may include signals gated by switches (knobs and buttons) for platform adjustment and for determining the mode of operation. The peripheral micro controller board 291 also has inputs for receiving signals from the battery stack 271 as to battery voltage, battery current, and battery temperature. The peripheral micro controller board 291 is in communication over bus 279 with a central micro controller board that may be used to control the wheel motors as described below in connection with FIG. 7.

Figure 7:
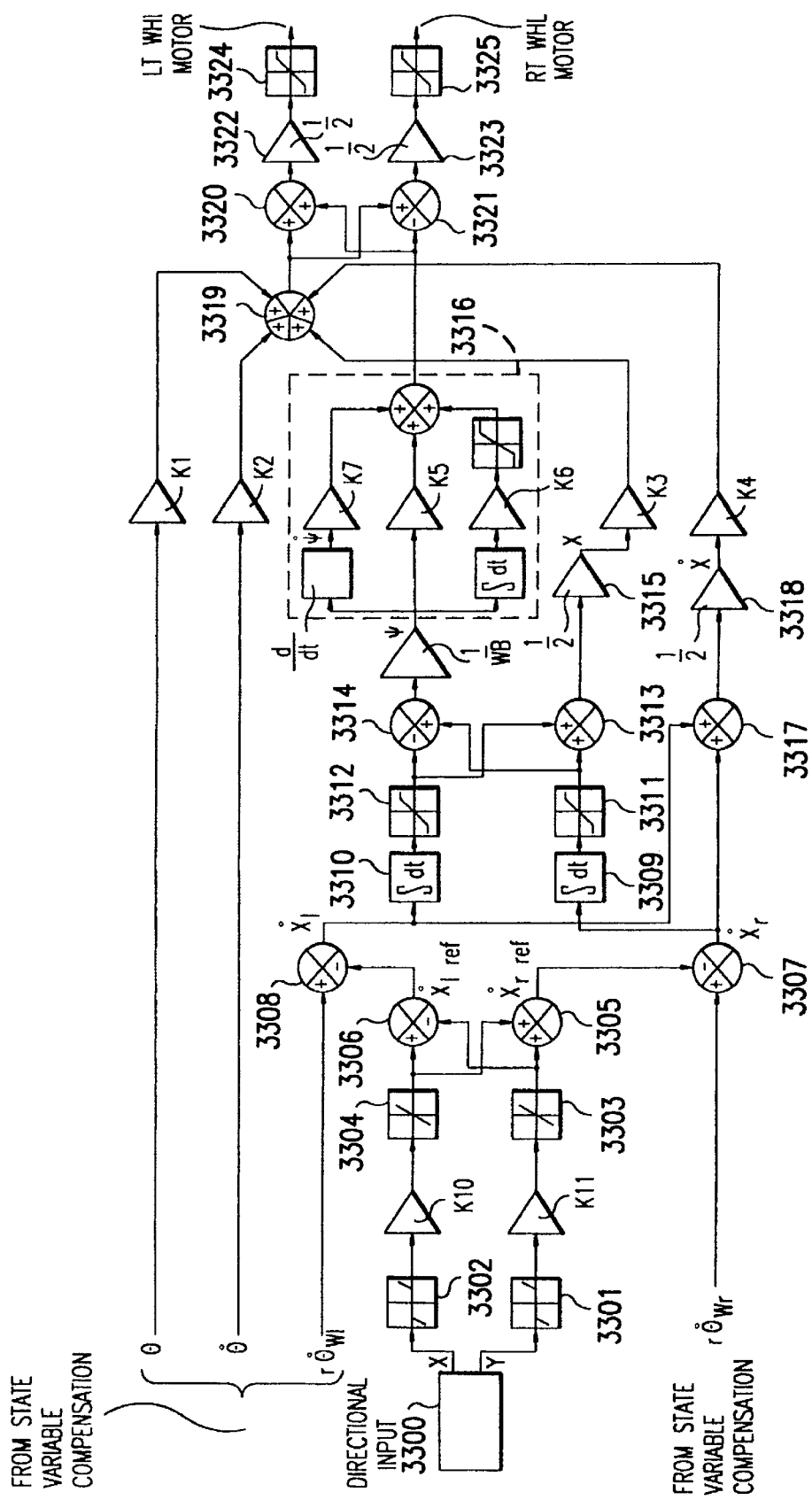
FIG. 7 is a schematic of the wheel motor control during balancing and normal locomotion, in accordance with an embodiment of the present invention.

FIG. 7 is a block diagram showing control algorithms, suitable for use in conjunction with the control assemblies of FIG. 6 to provide stability for a vehicle according to the embodiment of FIGS. 1–2 and other embodiments in which the vehicle and payload are balanced on two ground-contacting members, both during locomotion and in a fixed position. The following conventions are used in connection with the description below:

1. Variables defined in world coordinates are named using a single subscript in capital letters. World coordinates are coordinates fixed to the earth (inertial).
2. A non-subscripted r identifies a wheel radius.
3. Lower case subscripts are used to indicate other attributes, e.g., right/left, etc.: r=right; l=left; ref= reference; f=finish; s=start.
4. All angles are positive in the clockwise direction, where positive travel is in the positive x direction.
5. A dot over a variable indicates differentiation in time, e.g., $\dot{\theta}$.

FIG. 7 shows the control arrangement for the motors of the right and left wheels. The arrangement has inputs of $\theta$, $\dot{\theta}$, $r\dot{\theta}_{wl}$ (linear velocity of the left wheel relative to the world coordinate system) and $r\dot{\theta}_{wr}$ (linear velocity of the right wheel), in addition to directional inputs 3300 determined by joystick position along X and Y axes of a reference coordinate system. Inputs $\theta$, $\dot{\theta}$, and error signals x and $\dot{x}$ (described below), subject to gains $K_1$, $K_2$, $K_3$, and $K_4$ respectively, become inputs to summer 3319, which produces the basic balancing torque command for the wheels, in the general manner described above in connection with FIG. 3 above. The output of summer 3319 is combined with the output of yaw PID loop 3316 (described below) in summer 3320, then divided in divider 3322 and limited in saturation limiter 3324, to produce the left wheel torque command. Similarly, the output of summer 3319 is combined with the output of PID loop 3316 in summer 3321, then divided in divider 3323 and limited in saturation limiter 3325, to produce the right wheel torque command.

In FIG. 7, a directional input along the X axis moves the reference coordinate system along its X axis relative to the world coordinate system (which represents the traveled surface), at a velocity proportional to the displacement of the joystick. A directional input along the Y axis rotates the reference coordinate system about its Z axis at an angular velocity proportional to the displacement of the joystick. It will be appreciated that motion of the joystick in the positive X direction is here interpreted to mean forward motion; motion of the joystick in the negative X direction means reverse motion. Similarly, motion of the joystick in the positive Y direction means leftward turning, counter-clockwise as viewed from above; motion of the joystick in the negative Y direction means rightward turning clockwise as viewed from above. Hence the directional inputs Y and X are given deadband via deadband blocks 3301 and 3302 respectively, to widen the neutral position of the joystick, then subject to gains K11 and K10, then rate-limited by limiters 3303 and 3304 respectively, which limit the angular and linear accelerations respectively of the reference coordinate system. The sum of these outputs achieved through summer 3305 becomes the reference velocity $\dot{x}r$ refwhereas the difference of these outputs achieved through summer 3306 becomes the reference velocity $\dot{x}_{l\ ref}$. These reference velocities are subtracted in summers 3308 and 3307 from compensated linear velocity input signals $r\dot{\theta}_{wl}$ and $r\dot{\theta}_{wr}$ for left and right wheels to obtain velocity error signals $\dot{x}_l$ and $\dot{x}_r$ for left and right wheels within the reference coordinate system. In turn the average of these signals, determined via summer 3317 and divider 3318, produces a linear velocity error signal. Displacement error signal x is derived by integrating $r\dot{\theta}_{wl}$ and $r\dot{\theta}_{wr}$ in integrators 3310 and 3309, limiting the results in saturation limiters 3312 and 3311, and then averaging their outputs via summer 3313 and divider 3315. The difference between these displacements, determined via summer 3314, produces the yaw error signal $\psi$.

The yaw error signal $\psi$ is run through a standard proportional-plus-integral-plus-derivative (PID) control loop 3316, the output of which is combined with the output of the basic balancing torque command of summer 3319, to produce the individual wheel torque commands, which cause the wheels to maintain fore-aft stability and also cause the vehicle to align itself with the axes of, and follow the origin of, the reference coordinate system as directed by directional input 3300.

Let us now consider how this control causes the vehicle to start. The directional input 3300 (which may be a joystick) which will provide a positive x for forward motion. The signal is divided and summed in summers 3308 and 3307, and subtracted from the right and left wheel velocity $\dot{x}_R$ and $\dot{x}_L$ providing a negative correction; this correction leads ultimately to a negative torque contribution at summer 3319, causing the wheels to move backward, so as to create a torque due to gravity that causes the vehicle to lean forward. This forward lean leads to changing $\theta$ and $\dot{\theta}$, which leads to positive corrections in summer 3319, causing the vehicle to move forward. Thus, moving the joystick forward or backward will cause the vehicle to lean forward or backward, as the case may be, and to move in the direction of the lean. This is a property of the control of FIG. 7. An equivalent result can be achieved by leaning, where $K_3$ is zero.

Anytime acceleration of the vehicle is desired, it is necessary to establish system lean. For example, to achieve forward acceleration of the vehicle, there must be forward system lean; the center of gravity of the system (vehicle and payload) must be placed forward of the center of the pressure distribution of the contact region where the wheels contact the ground. The more the lean, the more the acceleration. Thus, furthermore, it can be seen that leaning, in conjunction with gravity and friction, determines acceleration (positive or negative) of the system. In this manner, if the vehicle is moving forward, pitching the system back will achieve braking. Because the vehicle must overcome friction, there must even be some system lean when the vehicle is moving at constant velocity over level ground. In other words, looking at the torque on the vehicle caused by gravity and the torque caused by all other external forces, the torque applied by the motorized drive is adjusted so that the net torque from all these sources produces a desired acceleration.

In a further embodiment, any of the foregoing embodiments of a vehicle in accordance with the present invention may be provided with speed limiting to maintain balance and control, which may otherwise be lost if the wheels (arcuate elements, or other ground-contacting members) were permitted to reach the maximum speed of which they are currently capable of being driven.

Speed limiting is accomplished by pitching the vehicle back in the direction opposite from the current direction of travel, which causes the vehicle to slow down. (As discussed above, the extent and direction of system lean determine the vehicle's acceleration.) In this embodiment, the vehicle is pitched back by adding a pitch modification to the inclinometer pitch value. Speed limiting occurs whenever the vehicle velocity of the vehicle exceeds a threshold that is the determined speed limit of the vehicle. The pitch modification is determined by looking at the difference between the vehicle velocity and the determined speed limit, integrated over time.

Alternatively, the headroom between a specified maximum power output and the current power output of the motors may be monitored. In response to the headroom falling below a specified limit, an alarm may be generated to warn the user to reduce the speed of the vehicle. The alarm may be audible, visual, or, alternatively the alarm may be tactile or may be provided by modulation of the motor drives, providing a 'rumbling' ride that is readily perceived by the user.

The automatic pitch modification sequence, in response to a detected speed at a specified speed limit, is maintained until the vehicle slows to the desired dropout speed (some speed slightly below the speed limit), and then the pitch angle is smoothly returned to its original value.

One method for determining the speed limit of the vehicle is to monitor the battery voltage, which is then used to estimate the maximum velocity the vehicle is currently capable of maintaining. Another method is to measure the voltages of the battery and the motor and to monitor the difference between the two; the difference provides an estimate of the amount of velocity margin (or 'headroom') currently available to the vehicle.

Leaning of the user may additionally be limited, in accordance with a further embodiment of the invention, by a physical constraint such as a vertical member coupled to the platform, thus preventing leaning, in any specified direction, beyond the physical constraint.

The pitch offset, allowing modification of $\dot{\theta}_0$, as discussed above in reference to Equation 4, may be adjusted by the user by means of thumb-wheel 32 (shown in FIG. 1). Additionally, a secondary control 34 (shown in FIG. 1) may be provided, in accordance with embodiments of the invention, for changing the control architecture or function of the thumb-wheel. Thus, thumb-wheel 32 can also be put into a mode that operates to drive both wheels in the same direction. This allows a personal mobility vehicle such as vehicle 18 to be used as sort of a powered handcart that the user trails behind her or pushes ahead of her. This is especially useful when such a personal transporter has to be carried up stairs because the motors 531 and 534 (shown in FIG. 5) are used to lift the vehicle to the next riser so that the user does not have to use as much force as would otherwise be required. This mode of operation of the vehicle is referred to as "drive mode." Additionally, upon designation by the secondary selector 34, thumb wheel 32 may be used by the user for purposes of steering the vehicle.

The present invention may also be implemented in a number of further embodiments. We have found that a vehicle in accordance with the invention may act suitably as a prosthetic device for persons who have an impairment, caused by disease (such as Parkinson's Disease or ear disorders) or defect, in their ability to maintain balance or to achieve locomotion.

A control loop, as employed in accordance with an embodiment of the present invention, may advantageously be used for ameliorating the symptoms of balance-impairing diseases. A traditional approach to treatment of Parkinson's Disease is the administration of drugs such as levodopa to alleviate symptoms of progressive tremor, bradykinesia and rigidity, however, in most patients the disease is incompletely controlled. D. Calne, "Drug Therapy: Treatment of Parkinson's Disease," *New England J. Medicine,* vol. 329, pp. 1021–2, (1993). Additionally, prolonged use of antiparkinsonian drugs leads to progressively adverse reactions to the drugs. Id.

A person suffering from Parkinson's disease is neither a passive nor cooperative load, but rather, since the person suffers from impaired powers of voluntary movement, the person has difficulty controlling his or her own balance, whether on a platform or on the ground. The tremors of such a person cause additional forces on the platform or vehicle upon which the person is seated or standing, not necessarily oriented in a balance-restoring direction.

The prosthetic device achieved by the vehicle functions as an extension of the person's own balance system and locomotion system, since the vehicle has a feedback loop that takes into account changes in the vehicle's center of gravity attributable to motion of the person relative to the vehicle. Providing a vehicle to such a handicapped person is thus a method of fitting a prosthesis that permits locomotion and balance control when these would otherwise be unavailable. We have observed a dramatic restoration of balance and locomotion control to a person suffering from Parkinson's Disease who utilized a vehicle in accordance with embodiments of the present invention. Surprisingly, the effect on a Parkinson's patient who is using the vehicle is to substantially reduce tremors. Apparently, the inclusion of the Parkinson's patient in the feedback loop of the combined vehicle-passenger system creates an environment permitting alleviation of symptoms experienced by a Parkinson's patient.

In addition to the embodiments of FIGS. 1–2, many other configurations of the personal mobility vehicles that are the subject of the present invention may be provided. The personal mobility vehicle may alternatively be provided with other configurations of ground-contacting members, some of which are now described.

The width of the ground-contacting members may advantageously be increased, in accordance with certain alternate embodiments of the invention, for traversing thin ice or other terrain where pressure of the vehicle exerted on the ground may pose a danger.

Figure 8:
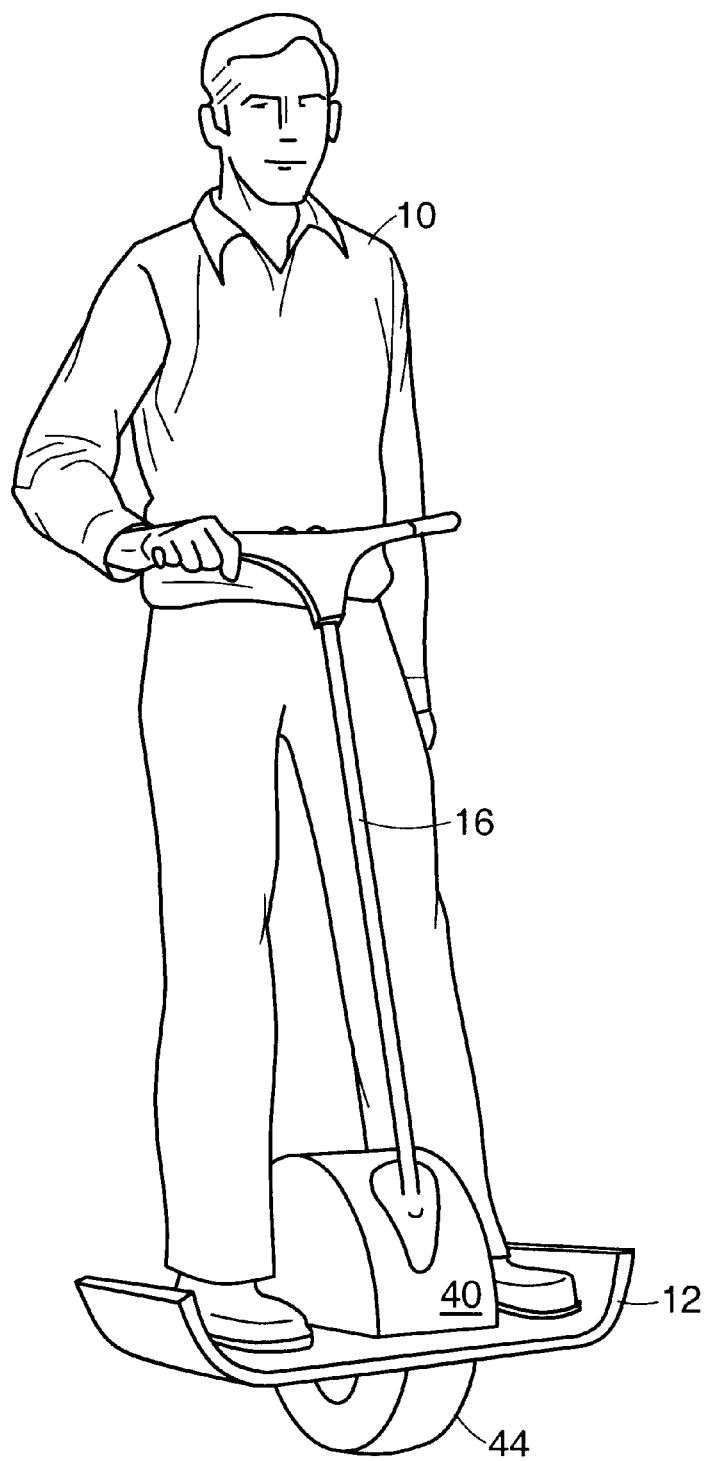
FIG. 8 shows a balancing vehicle with a single wheel central to the support platform of the vehicle and an articulated handle in accordance with an embodiment of the present invention.

Referring to FIG. 8, an alternate embodiment of the invention is shown in which ground contact is provided by a single wheel 44. A characteristic common to many of the embodiments of the present invention is the platform 12 on which subject 10 stands to operate the vehicle. Handle 16 is provided in certain embodiments of the invention, as is grip 18 on handle 16 for subject 12 to grip. In one embodiment of the invention, shown in FIG. 8, handle 16 is rigidly attached to platform 12, in this case, without limitation, via cowling 40. In an alternate embodiment of the invention, shown in FIG. 9, handle 16 may be articulated at pivot 46 with respect to a base 48 fixed to platform 12. Articulation of handle 16 at pivot 46 makes it easy for subject 10 to shift his weight forward or aft while maintaining one or both hands on grip 14. Platform 12 locomotes with respect to the ground by motion of at least one wheel 20, or other ground-contacting element. As with respect to earlier described embodiments, other ground-contacting elements such as arcuate members and clusters of wheels are described in the prior applications incorporated herein by reference, and the term "wheel" is used herein to refer to any such ground-contacting element without limitation.

Figure 9:
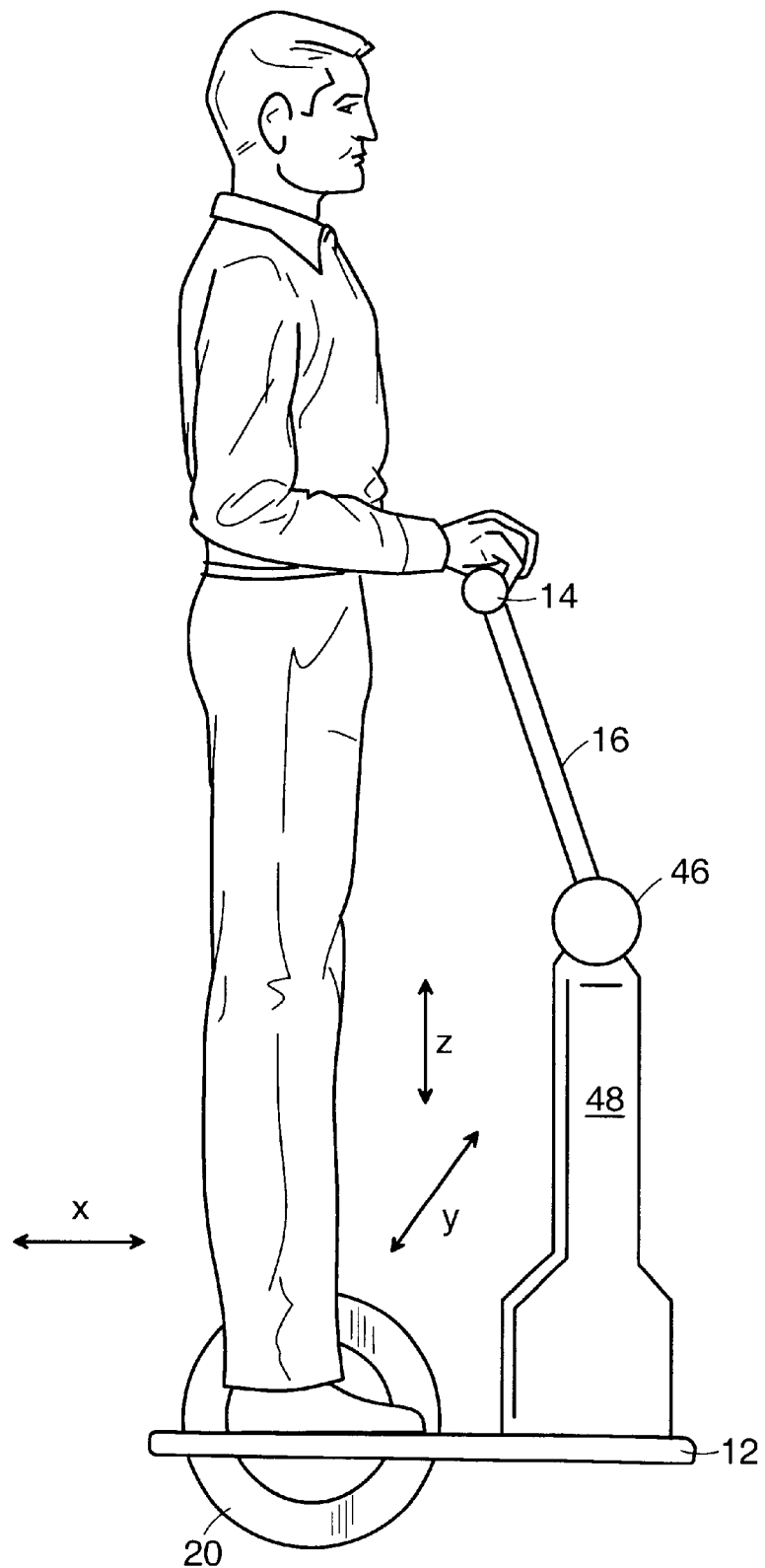
FIG. 9 shows a balancing vehicle with a single wheel central to the support platform of the vehicle and a handle in accordance with an embodiment of the present invention.
Figure 10:
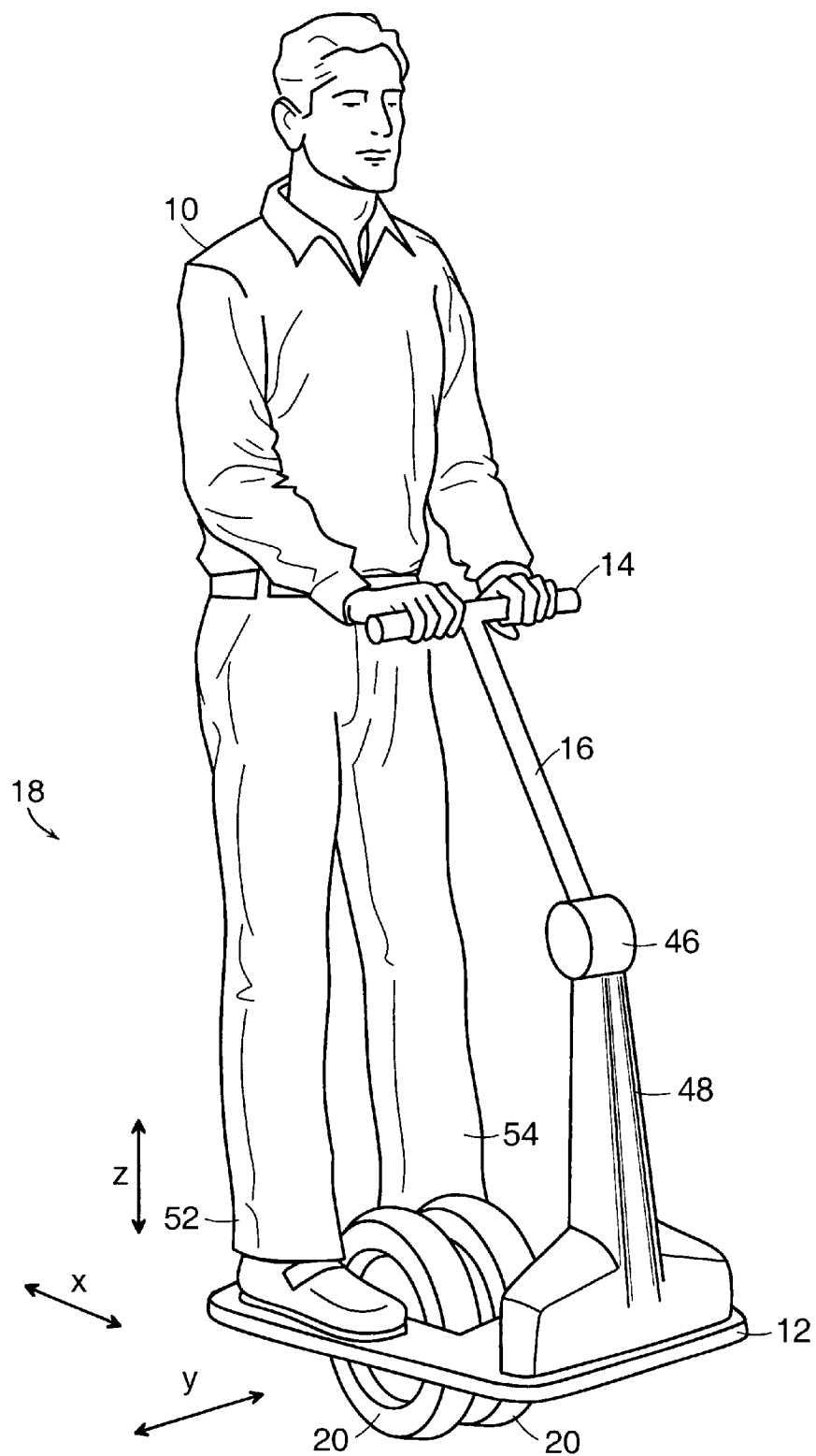
FIG. 10 shows a balancing vehicle with two coaxial wheels central to the support platform of the vehicle and an articulated handle in accordance with an embodiment of the present invention.

The single wheel 44 of unicycle embodiments of FIGS. 8 and 9 may be supplemented, as shown in FIG. 10, by a nearby wheel providing a pair of adjacent and coaxial wheels 20. It can be seen that the vehicle of FIG. 10, like vehicles of various other embodiments disclosed in this description, when relying on wheels 20 for contacting the ground, is inherently unstable in the fore-aft direction with respect to a vertical z. While the vehicle of FIG. 10 is relatively stable in the lateral direction, vehicles of some other embodiments are unstable in both lateral and fore-aft directions. The motion of vehicle 18 may be controlled by subject 10 shifting his weight, and thus the center of mass (CG) of the loaded vehicle, in accordance with teachings described above.

Also, as described above, in addition to the direct effect, of subject leaning, on the variables governing the torque applied to a motor for directing the vehicle, or as an alternate control strategy, user input may be separately incorporated into the control loop in a manner equivalent to variation of one or more of the input variables. Thus, for example, the user may provide an input, by means of a user interface of any sort, the input being treated by the control system equivalently to a change, for example, in vehicle tilt. Such an interface may include, for example, a thumbwheel or a joystick mounted on the grip 14.

Referring again to FIG. 10, steering of vehicle 18 may be provided by user 10 shifting his weight laterally (in the Y-Y direction) with respect to wheels 20. The change in position of user 10 relative to the platform 12, and/or the consequential shift of the CG of the combination of user 10 and vehicle 18 may be sensed using any strategy. One example is the use of one or more forceplates disposed on the upper surface of platform 14 to sense differential pressure exerted by a first leg 52 of user 10 with respect to a second leg 54 of the user. Alternatively, a seat (not shown) may be provided on platform 12 for supporting user 10, and one or more forceplates mounted on the seat may sense a shift in the weight of the user and thus generate a signal for controlling the velocity vector of the vehicle in response to user leaning. As an alternate example, a tilt of platform 12 relative to the axis (Y-Y) of rotation of wheel 20 may be sensed using an inclinometer, or one or more gyroscopes. Corrections may be applied to the measured tilt of differential pressure to account for irregularities in the surface being traversed by vehicle 18, as determined by the measured tilt, with respect to a plane perpendicular to gravity, of the axis (Y-Y) of rotation of wheel 20. In accordance with yet further alternate embodiments of the invention, a force sensor may be provided within handle 16 or a rotation sensor may be provided at pivot 46, either stratagem for sensing leaning by the user and applying the sensed leaning as a user input in the control loop for governing vehicle operation.

In accordance with other embodiments of the present invention, leaning by user 12 may be used solely for governing fore-aft motion of vehicle 10, or, alternatively, leaning may be used solely for governing steering of the vehicle, or, for both functions.

Figure 11:
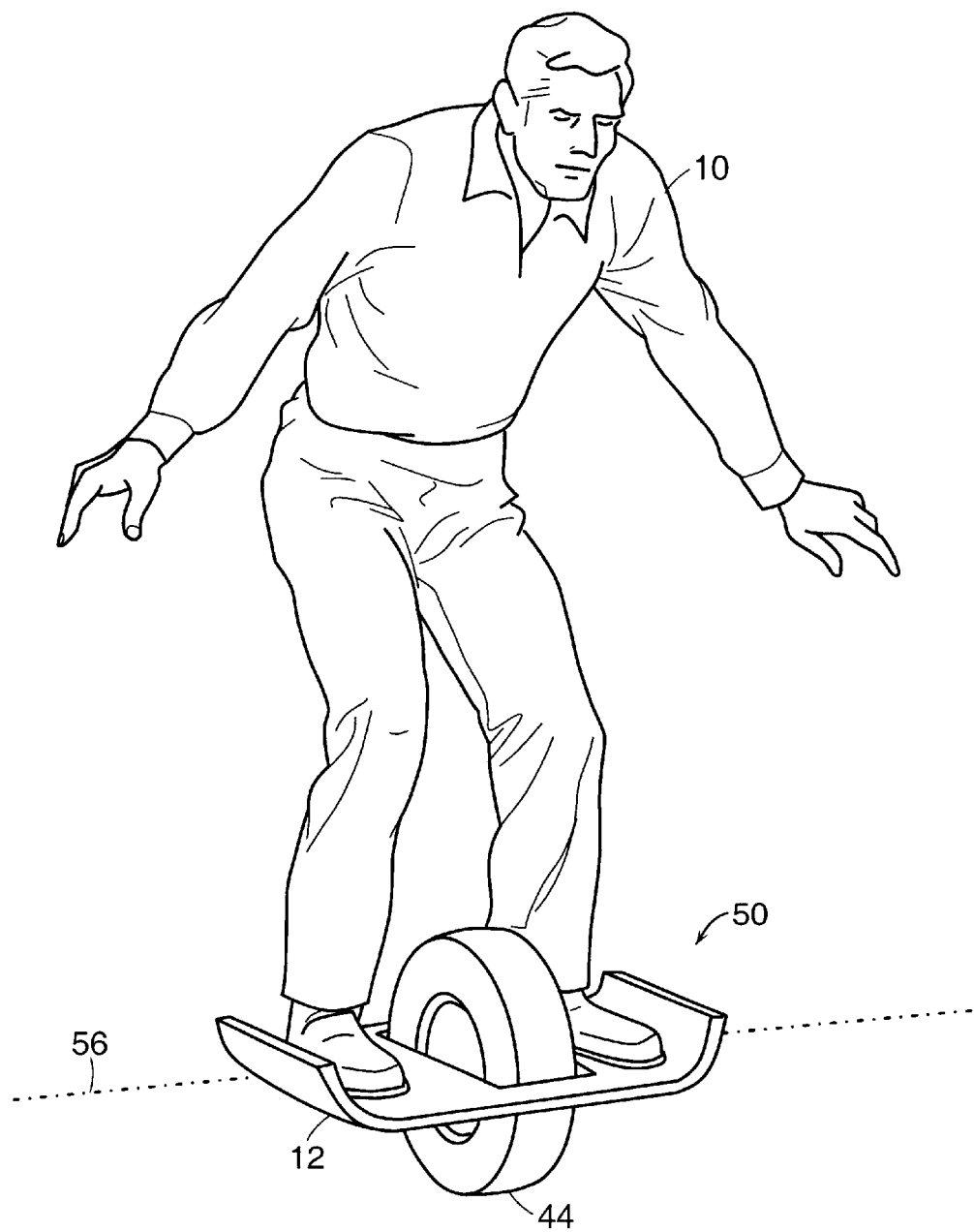
FIG. 11 shows a balancing vehicle with a single wheel central to the support platform of the vehicle and no handle in accordance with an embodiment of the present invention.

A front perspective view of an alternate embodiment of the invention is shown in FIG. 11 where vehicle 10 has a single wheel 24 and user 12 stands, during normal operation of the vehicle, on platform 14 astride wheel 24. An embodiment is shown wherein handle 16 is rigidly attached to platform 14, in this case, via cowling 40.

Figure 12:
FIG. 12 shows an alternate embodiment of a balancing vehicle with a single wheel central to the support platform of the vehicle and no handle in accordance with an embodiment of the present invention.
Figure 13:
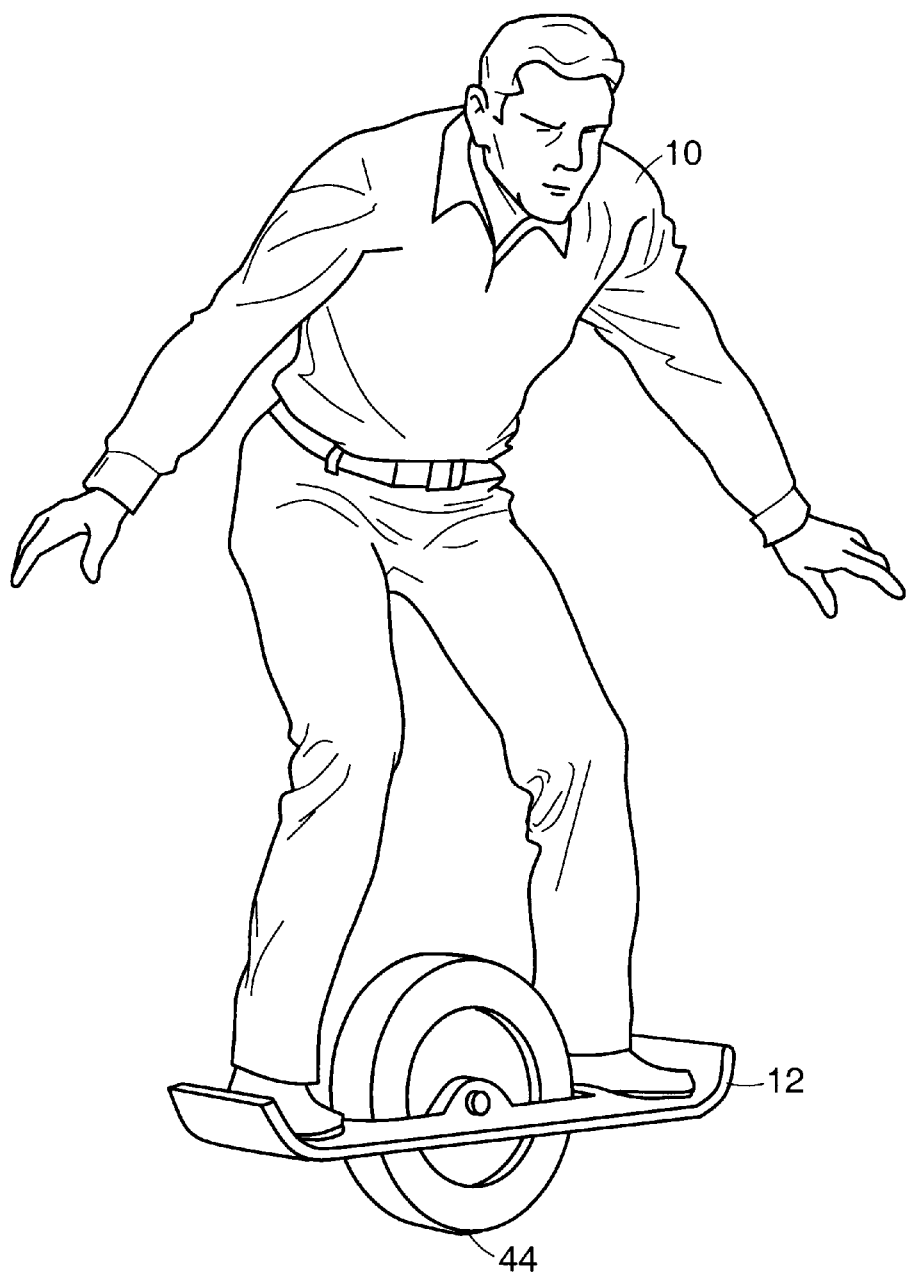
FIG. 13 shows a balancing vehicle with a single wheel transversely mounted central to the support platform of the vehicle and no handle in accordance with an embodiment of the present invention.
Figure 14:
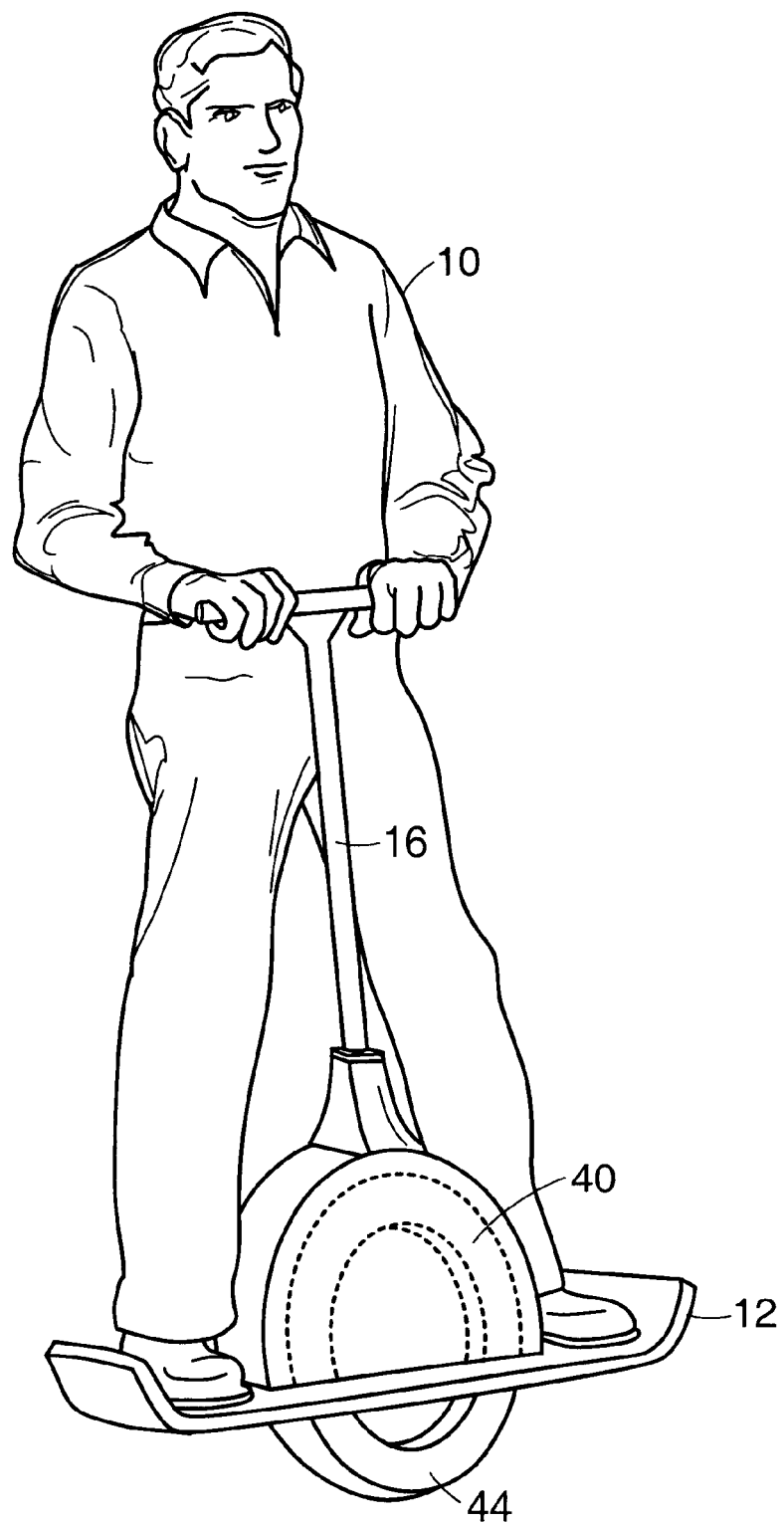
FIG. 14 shows a balancing vehicle with a single wheel transversely mounted central to the support platform of the vehicle and a handle in accordance with an embodiment of the present invention.

FIG. 11 shows an embodiment of the invention wherein a vehicle 50 is controlled by leaning, as described above with respect to other embodiments, and no handle is provided, such that the entire support of user 10 is by standing on platform 12. Within the scope of the present invention, as described herein and as claimed in any appended claims, user 10 may be supported on platform 12 by standing with feet positioned along axis 56 of rotation of wheel 44, as shown in FIG. 11, or, alternatively, with feet positioned astride axis 52 of rotation of wheel 44, as shown in FIG. 12 and FIG. 13. A handle 16 may also be provided in the case of a configuration of the invention in which wheel 44 is mounted transversely to the direction faced by user 10, with handle 16 coupled to platform 12 via cowling 40, as shown in FIG. 14.

Figure 15:
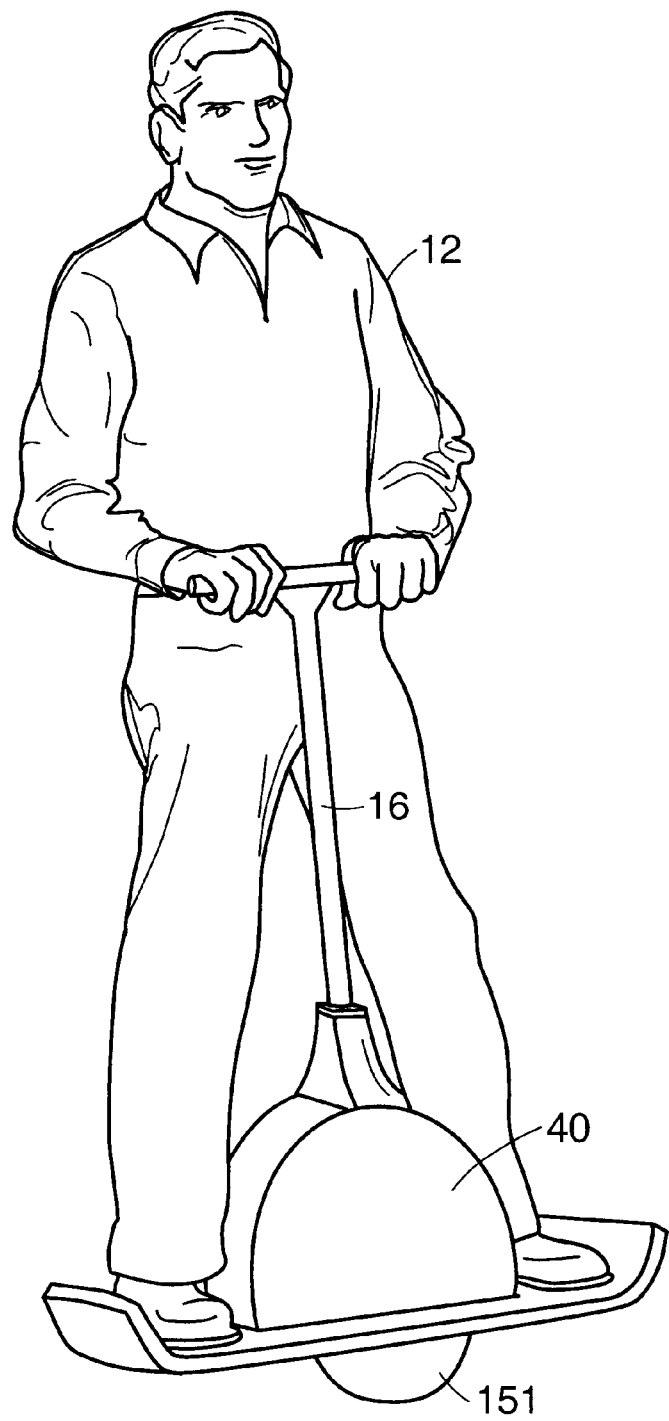
FIG. 15 shows a balancing vehicle with a uniball mounted central to the support platform of the vehicle and a handle in accordance with an embodiment of the present invention.

FIG. 15 shows an embodiment of a vehicle wherein the ground-contacting element is a uniball 151. Such a ball may be separately driven in the x and y directions and the vehicle stabilized in one or both of these directions in the manner described above.

In addition to the personal mobility vehicles described and claimed above, in accordance with alternate embodiments of the invention, scaled down versions of any of the embodiments heretofore described may be employed for recreational or educational purposes, whether or not human subjects are conveyed thereupon. Such toy versions may travel over various terrains while maintaining balance in the fore-aft plane.

The described embodiments of the invention are intended to be merely exemplary and numerous variations and modifications will be apparent to those skilled in the art. All such variations and modifications are intended to be within the scope of the present invention as defined in the appended claims.

What is claimed is:

1. A device for carrying a user with a desired unassisted motion over a surface, the device comprising:
   a. a platform which supports a payload including the user;
   b. a ground-contacting module coupled to the platform, the ground-contacting module capable of balanced operation on only two laterally disposed and separately rotatable primary ground-contacting members, the platform and the ground-contacting module being components of an assembly; and
   c. a motorized drive arrangement, mounted to the assembly, the motorized drive arrangement causing, when powered, motion of the assembly in such a manner as to be propelled in response to leaning of the device and such that leaning of the device is not cancelled while the device is in motion.

2. A device in accordance with claim 1, further comprising a differential controller actuatable to cause each of the at least two ground-contacting members to be differentially driven so as to cause a specified turning motion of the device about a device-fixed vertical axis.

3. A device in accordance with claim 2, wherein the differential controller is actuatable by the user.

4. A device in accordance with claim 1, wherein the two laterally disposed primary ground-contacting members are wheels.

5. A device in accordance with claim 1, wherein the ground-contacting module contacts an underlying surface only through the primary ground-contacting members.

6. A device for carrying a user, the device comprising:
   a. a platform which supports a payload, the payload including the user;
   b. a ground-contacting module, mounted to the platform, capable of balanced operation on only two laterally disposed primary ground-contacting members separately rotatable;
   c. a motorized drive arrangement, coupled to the ground-contacting module, for propelling the ground-contacting module across an underlying surface in such a manner manner as to be propelled in response to leaning of the device and such that leaning of the device is not cancelled while the device is in motion;
   d. a differential controller actuatable to cause each of the two primary ground-contacting members to be differentially driven so as to cause a specified turning motion of the vehicle about a vertical axis fixed with respect to the device.

7. A device in accordance with claim 6, wherein the differential controller is actuatable by the user.

8. A device for carrying a user with a desired motion over a surface, the device comprising:
   a. a platform which supports the user, the platform defining a fore-aft plane;
   b. a ground-contacting module mounted to the platform, the ground-contacting module including at least two laterally disposed ground-contacting members separately rotatable, the platform and the ground-contacting module being components of an assembly;
   c. a motorized drive arrangement, mounted to the assembly, which causes, when powered, locomotion of the assembly in such a manner as to be propelled in response to leaning of the device and such that leaning of the device is not cancelled while the device is in motion; and
   d. a differential controller actuatable to cause each of the at least two ground-contacting members to be differentially driven so as to cause a specified turning motion of the device about a device-fixed vertical axis.

9. A vehicle in accordance with any of claims 1, 6 or 8, wherein the motorized drive arrangement is controllable by the user.

10. A vehicle in accordance with any of claims 1, 6 or 8, wherein the motorized drive arrangement is controllable by leaning of the user.

11. A vehicle in accordance with any of claims 1, 6, or 8, wherein the motorized drive arrangement is controlled solely by leaning of the subject.

12. A method in accordance with any of claims 1, 6, or 8, wherein the motorized drive arrangement is controlled by an orientation of the user with respect to the platform.

13. A device in accordance with either of claims 1 or 6, wherein the motorized drive arrangement is controllable by a user input device for receiving an indication from the user of a direction of desired movement.

14. A device in accordance with either of claims 1 or 6, wherein the motorized drive arrangement is controllable by a user input device for receiving an indication from the user of a direction of desired movement of the vehicle and for causing in response thereto the device to lean in the direction of desired movement.

15. A device in accordance with either of claims 1 or 6, further including a motorized drive arrangement controller that causes the vehicle to be propelled at a specified velocity wherein such specified velocity may be arbitrarily close to zero velocity.

16. A vehicle in accordance with claim 15, wherein the specified velocity is specifiable by the user.

17. A device in accordance with claim 15, wherein the specified velocity is specifiable by a user input device.

18. A device in accordance with claim 15, wherein the specified velocity is specifiable by leaning of the user on the ground-contacting module.

19. A device in accordance with claim 15, wherein the specified velocity is specifiable by orientation of the user with respect to the ground-contacting module.

20. A device in accordance with claim 15, wherein the specified velocity is specifiable by a distribution of weight of the payload with respect to the ground-contacting module.

21. A device in accordance with claim 15, wherein the motorized drive arrangement controller is capable of causing the device to stand substantially at a specified location.

22. A device in accordance with either of claims 1 or 6, wherein operation of the device includes locomotion.

23. A device in accordance with either of claims 1 or 6, further including a motorized drive arrangement controller that causes the device to stand substantially at a specified location.

24. A method for causing a vehicle to carry a person with a desired unassisted motion over a surface, the method comprising:
   a. positioning the person on a pedestal which supports a payload including the person, the pedestal mounted to a ground-contacting module, the ground-contacting module capable of balanced operation on only two laterally disposed primary ground-contacting members separately rotatable, the pedestal and the ground-contacting module being components of an assembly; and
   b. operating a motorized drive arrangement, mounted to the assembly, the motorized drive arrangement causing, when powered, locomotion of the assembly in such a manner as to be propelled in response to leaning of the device and such at leaning of the device is not cancelled while the device is in motion.

25. A method in accordance with claim 24, further comprising utilizing a differential controller to cause each of the at least two ground-contacting members to be differentially driven so as to cause a specified turning motion of the device about a device-fixed vertical axis.

26. A method in accordance with claim 25, wherein the differential controller is actuatable by the user.

27. A device in accordance with claim 24, wherein the two laterally disposed primary ground-contacting members are wheels.

28. A method of using a vehicle to carry a user, the method comprising:
   a. positioning the user on a platform which supports a payload, the payload including the user, the platform mounted to a ground-contacting module, the ground-contacting module including only two laterally disposed primary ground-contacting members separately rotatable;
   b. operating a motorized drive arrangement, coupled to the ground-contacting module, for propelling the ground-contacting module across an underlying surface in such a manner as to be propelled in response to leaning of the device and such that leaning of the device is not cancelled while the device is in motion; and
   c. using a differential controller to cause each of the two primary ground-contacting members to be differentially driven so as to cause a specified turning motion of the vehicle about a vertical axis fixed with respect to the device.

29. A method of using a vehicle to carry a user, the method comprising:
   a. positioning the user on a platform which supports a payload, the payload including the user, the platform mounted to a ground-contacting module, the ground-contacting module capable of balanced operation on only two laterally disposed primary ground-contacting members separately rotatable;
   b. operating a motorized drive arrangement, coupled to the ground-contacting module, for propelling the ground-contacting module across an underlying surface in such a manner as to be propelled in response to leaning of the device and such that leaning of the device is not cancelled while the device is in motion; and
   c. using a differential controller to cause each of the two primary ground-contacting members to be differentially driven so as to cause a specified turning motion of the vehicle about a vertical axis fixed with respect to the device.

30. A method in accordance with either of claims 28 or 29, wherein the ground-contacting members are wheels.

31. A method for carrying a user with a desired motion over a surface, the method comprising:
   a. positioning the user on a platform, the platform defining a fore-aft plane and mounted to a ground-contacting module, the ground-contacting module including at least two laterally disposed ground-contacting members separately rotatable, the platform and the ground-contacting module being components of an assembly;
   b. operating a motorized drive arrangement, mounted to the assembly, to cause, when powered, locomotion of the assembly in such a manner as to be propelled in response to leaning of the device and such that leaning of the device is not cancelled while the device is in motion; and
   c. using a differential controller actuatable to cause each of the at least two ground-contacting members to be differentially driven so as to cause a specified turning motion of the device about a device-fixed vertical axis.

32. A method in accordance with claims 31, wherein the at least two ground-contacting.

* * * * *